June 17, 1930.  A. J. BATES, JR  1,764,285
SHEARING MACHINE
Filed Nov. 5, 1926   11 Sheets-Sheet 3
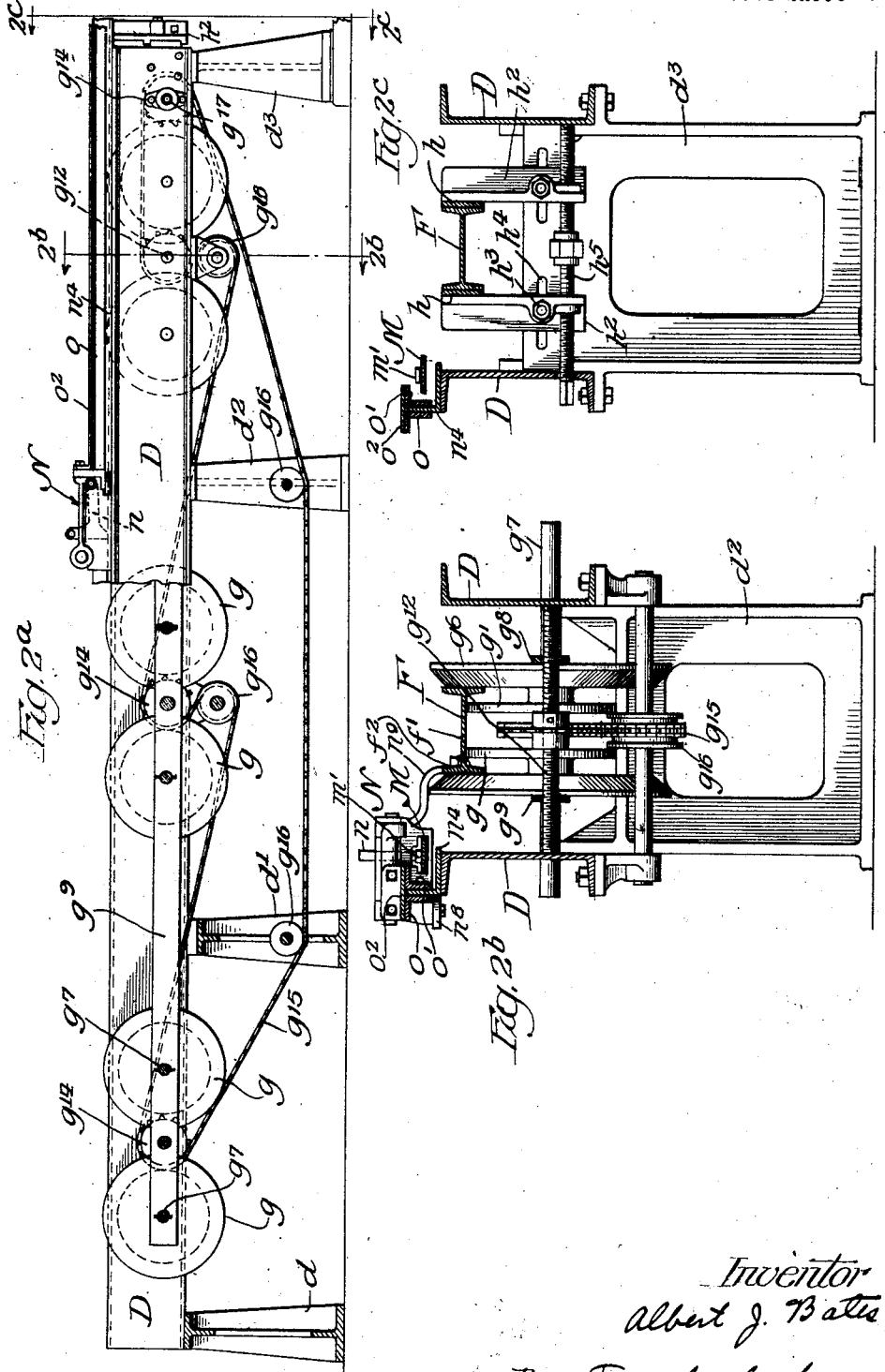

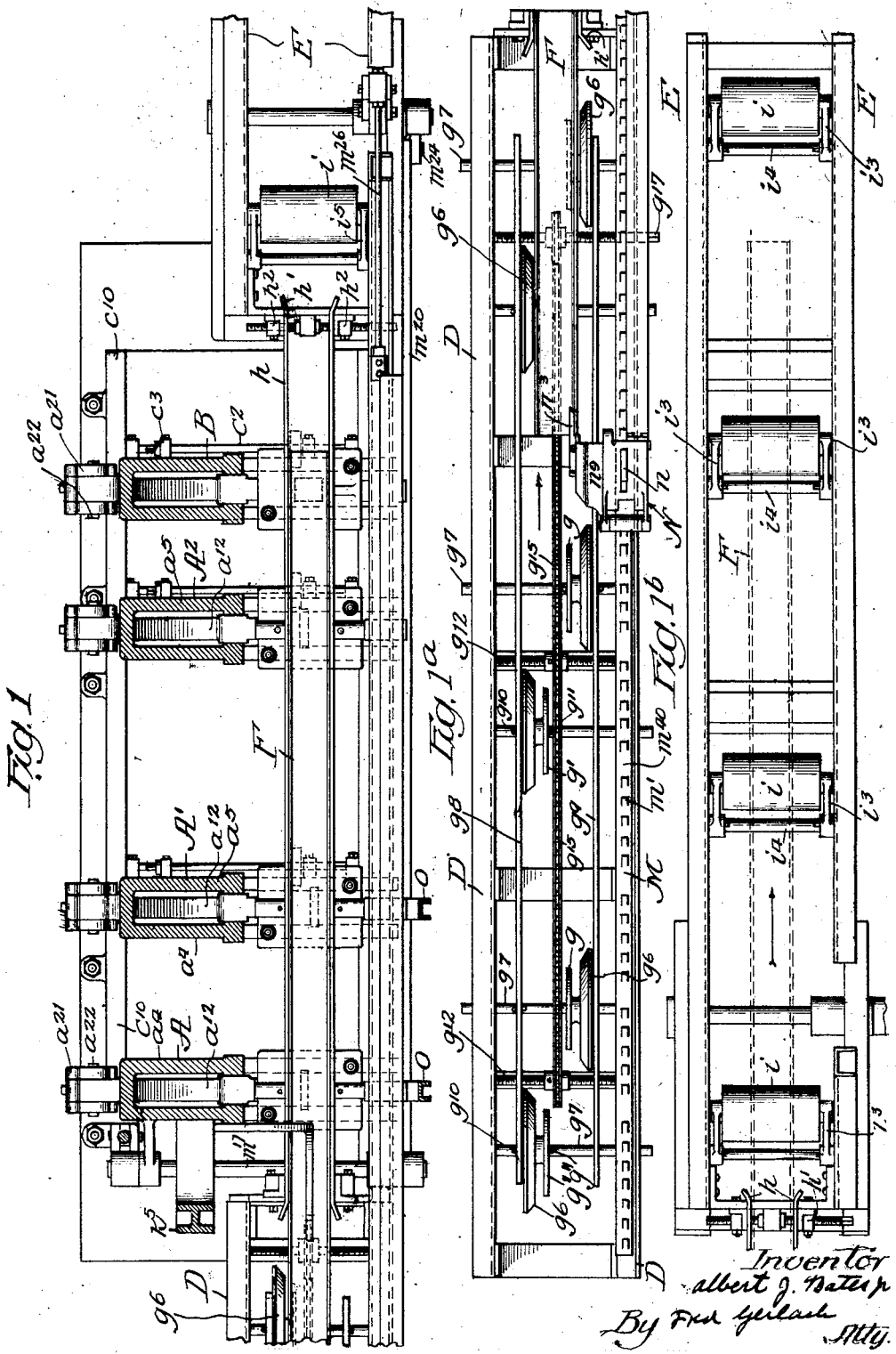

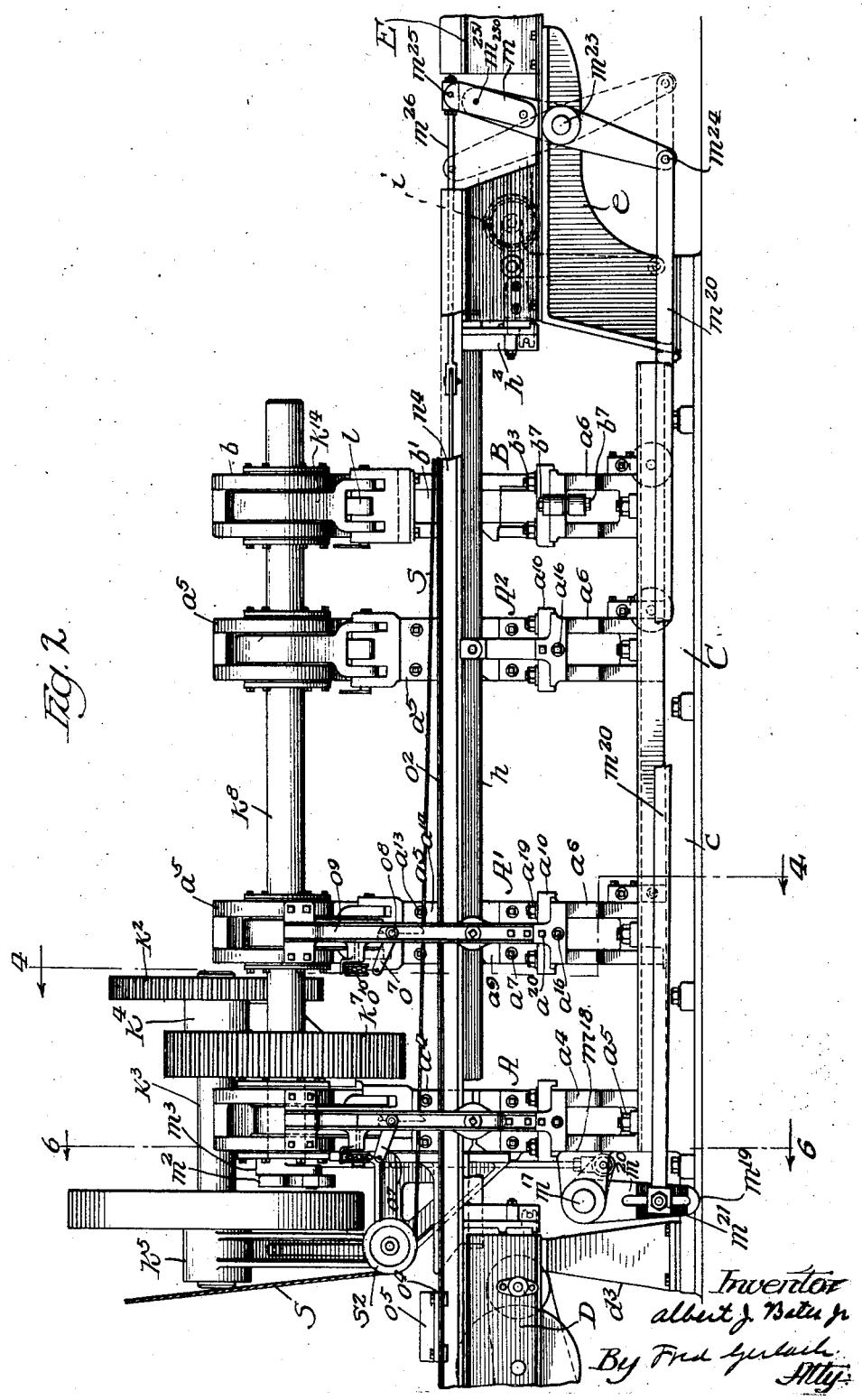

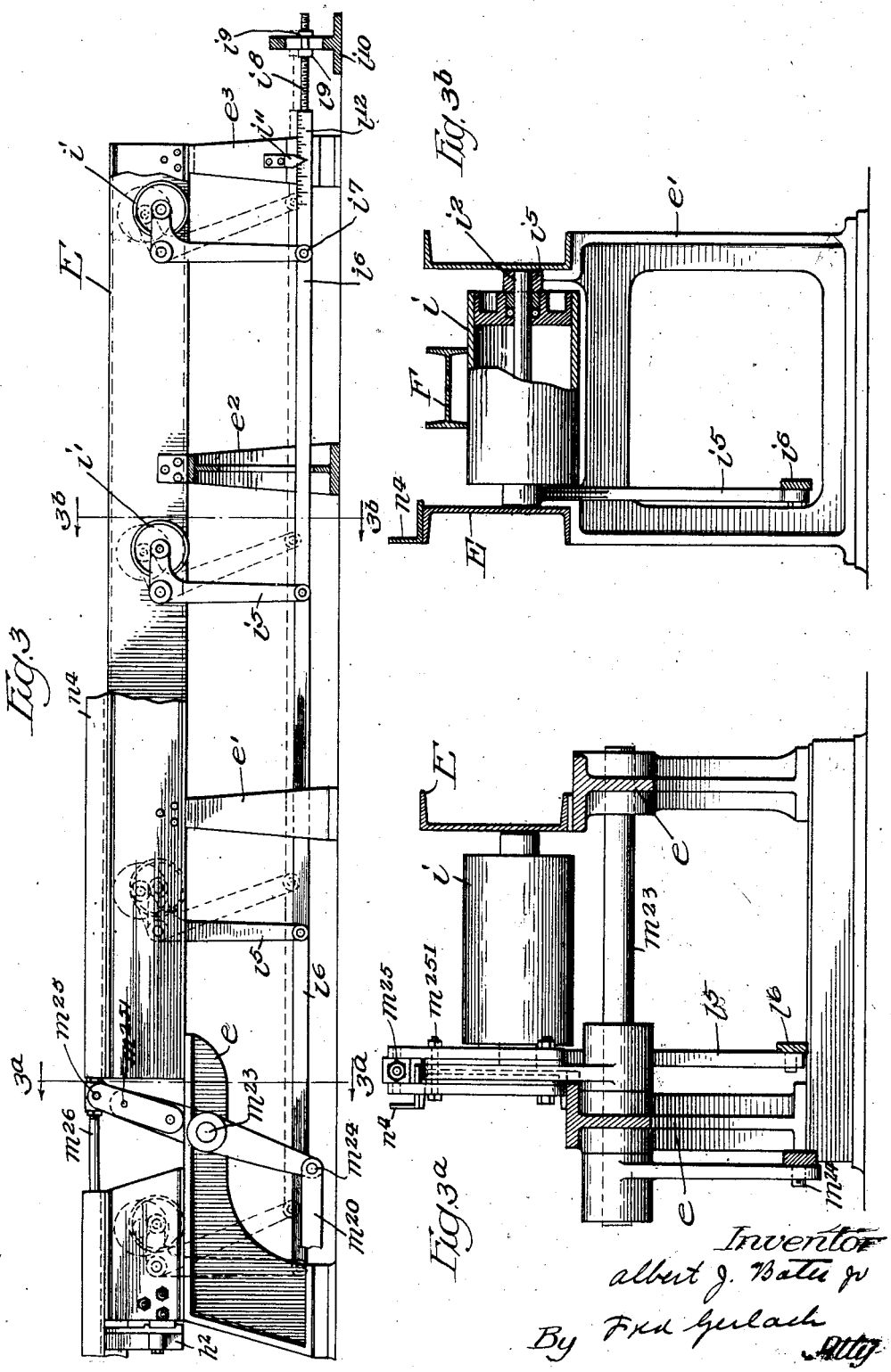

June 17, 1930. A. J. BATES, JR 1,764,285
SHEARING MACHINE
Filed Nov. 5, 1926 11 Sheets-Sheet 5
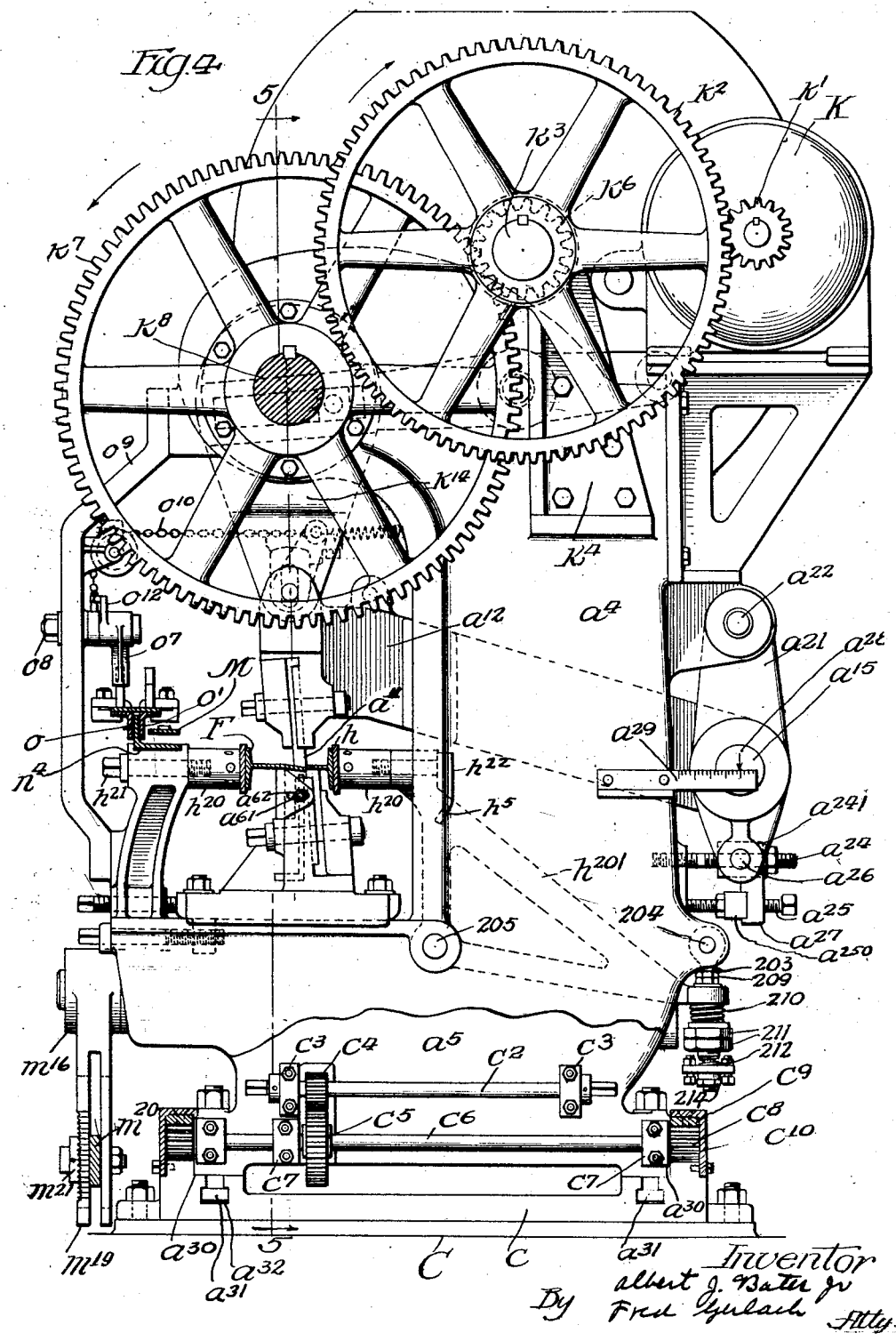

June 17, 1930.                A. J. BATES, JR                1,764,285
                              SHEARING MACHINE
                   Filed Nov. 5, 1926          11 Sheets-Sheet 6
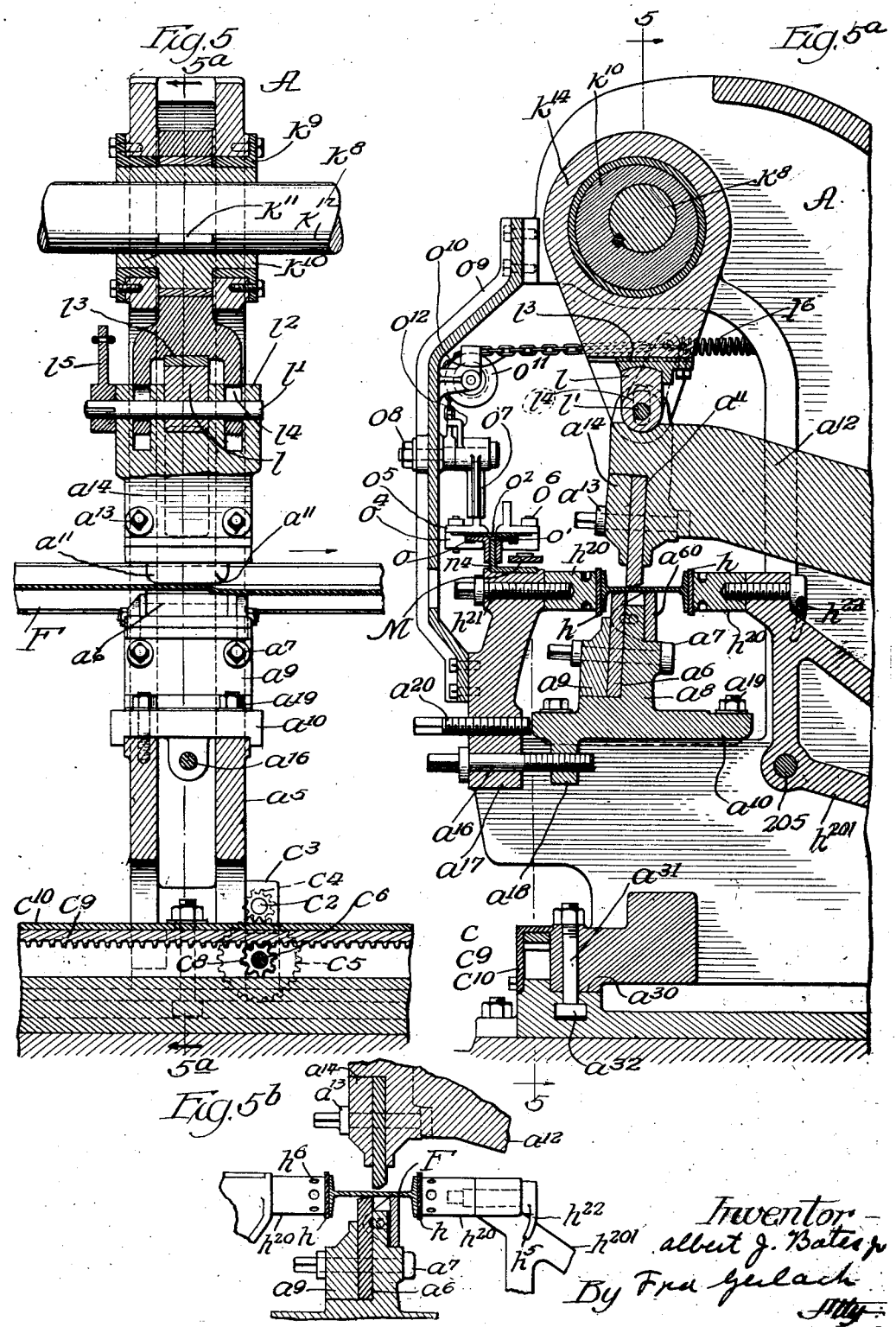

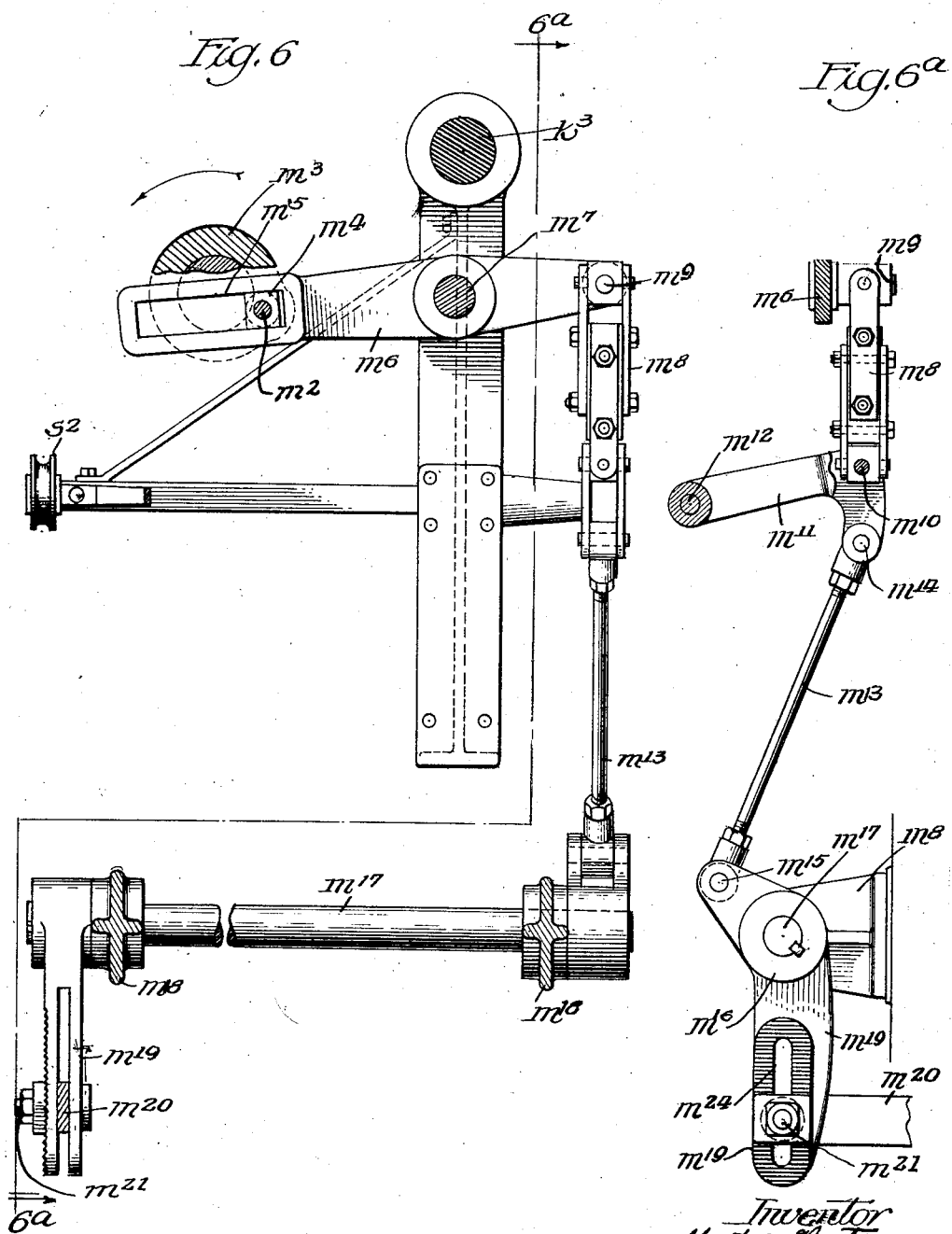

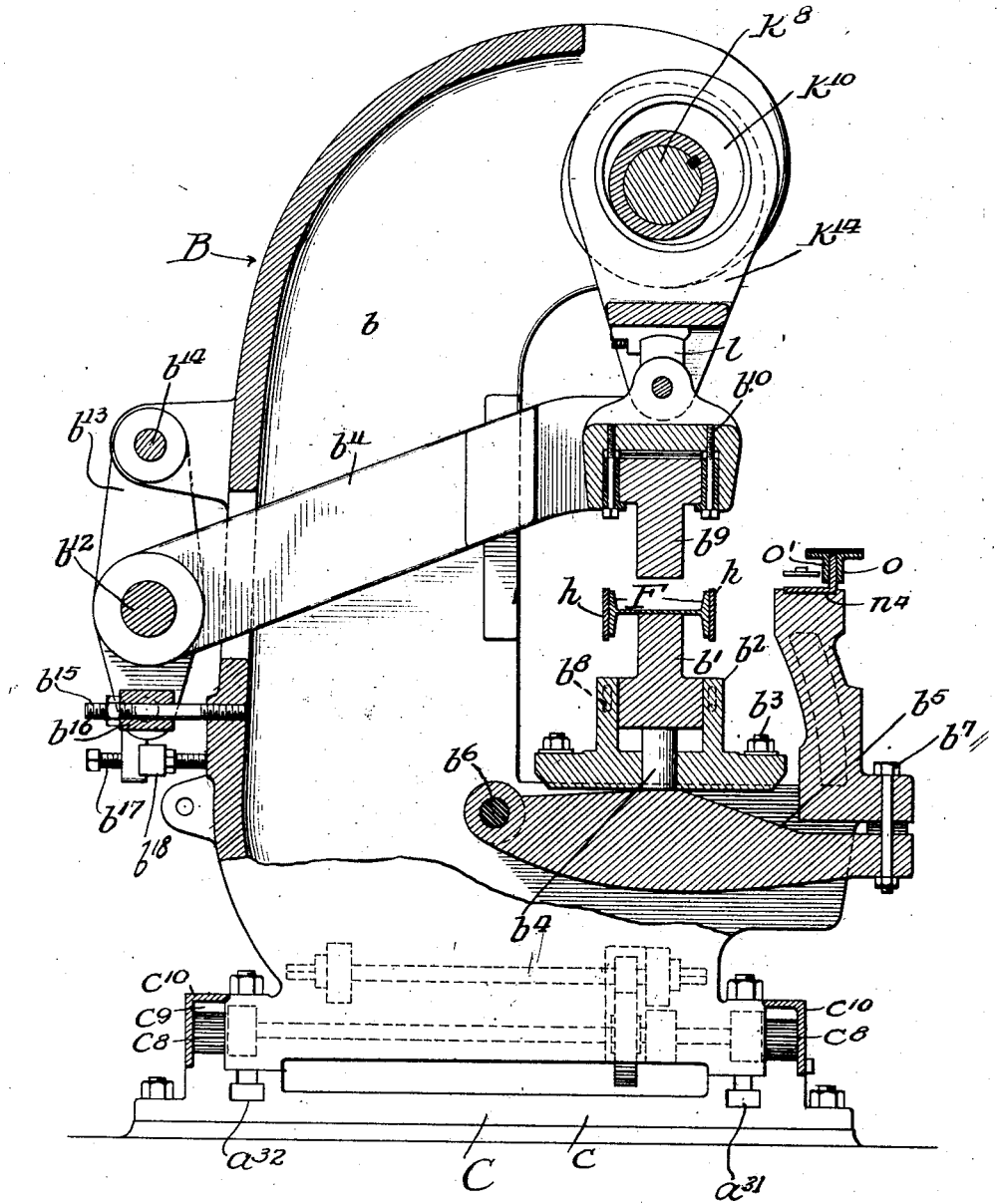

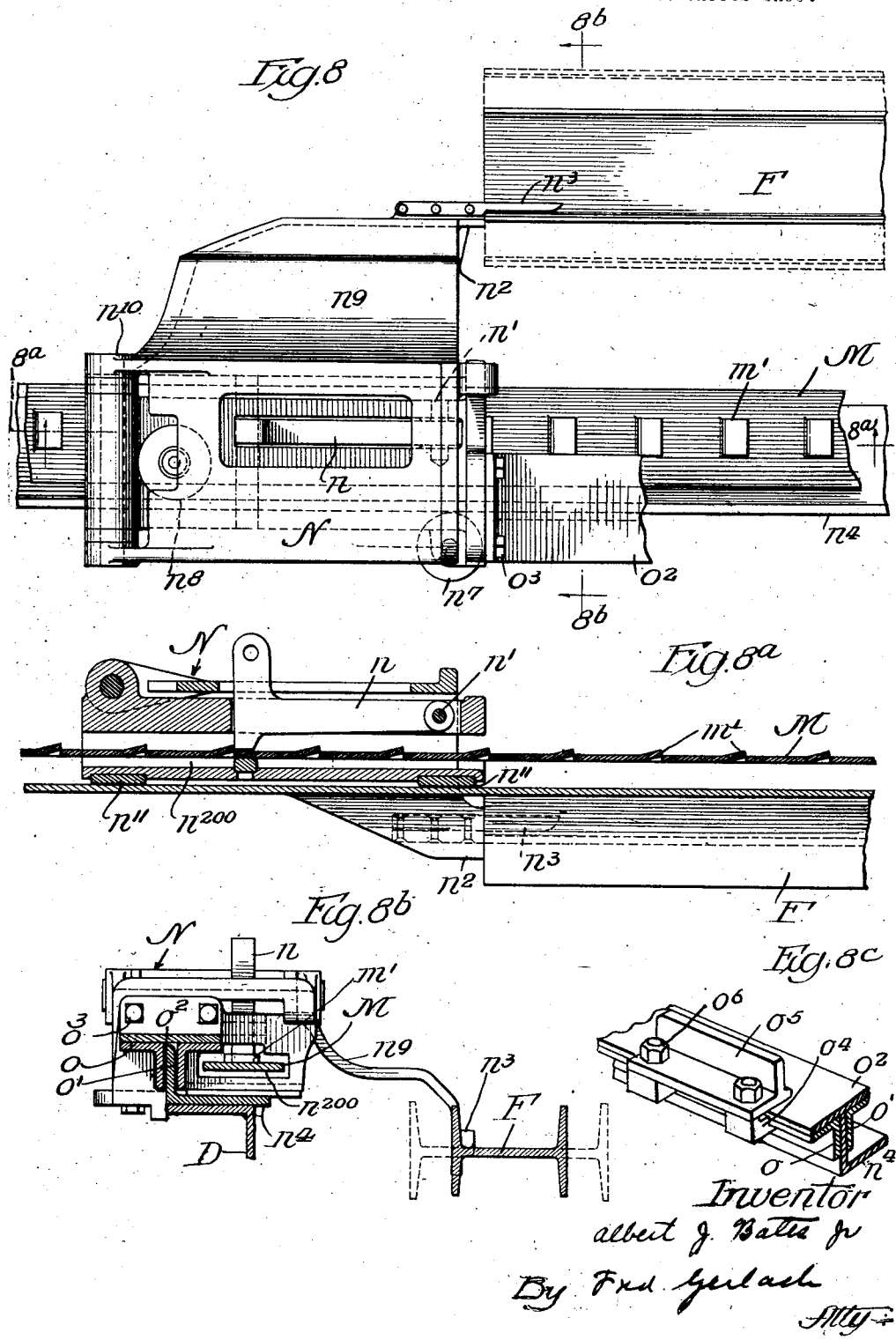

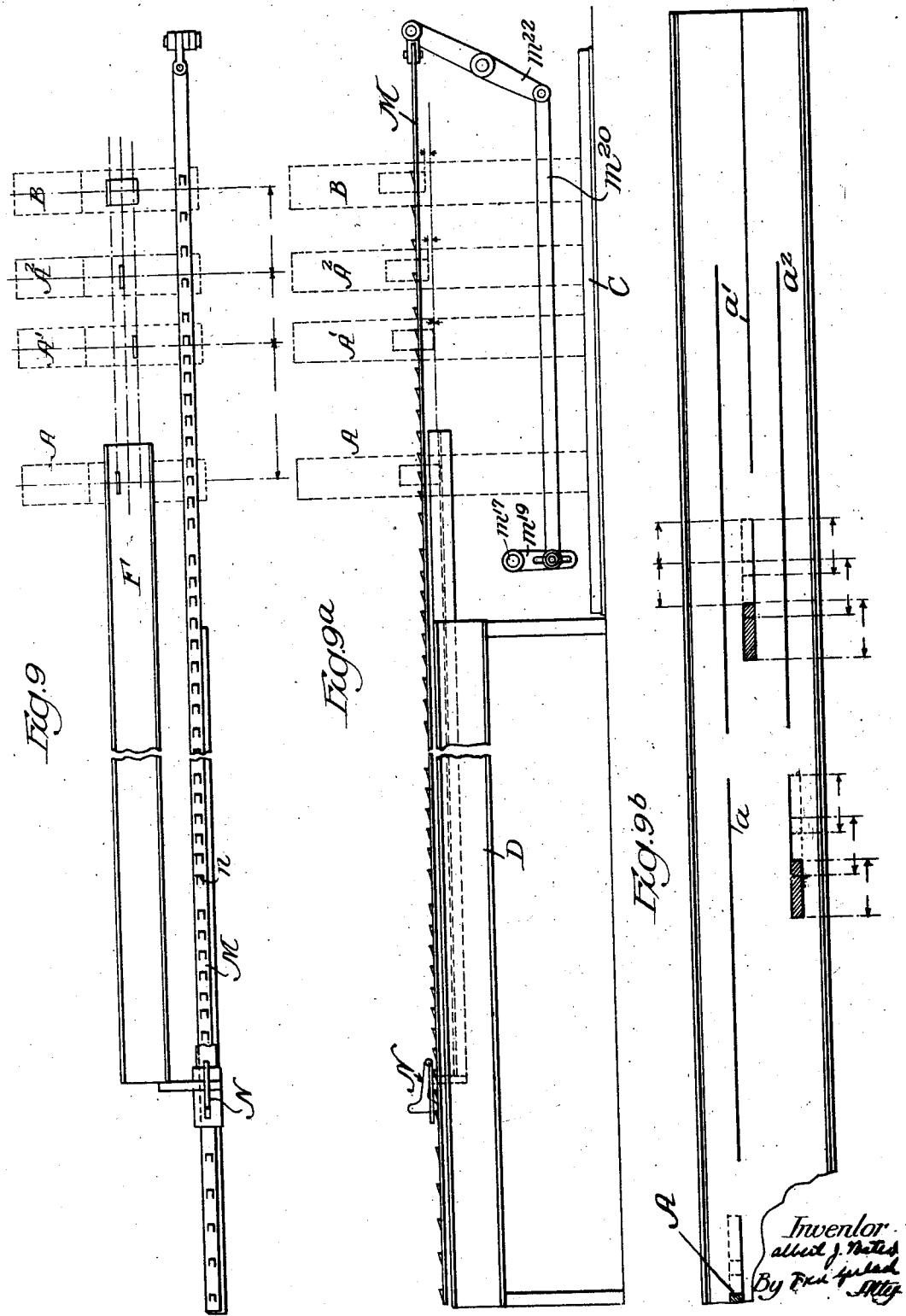

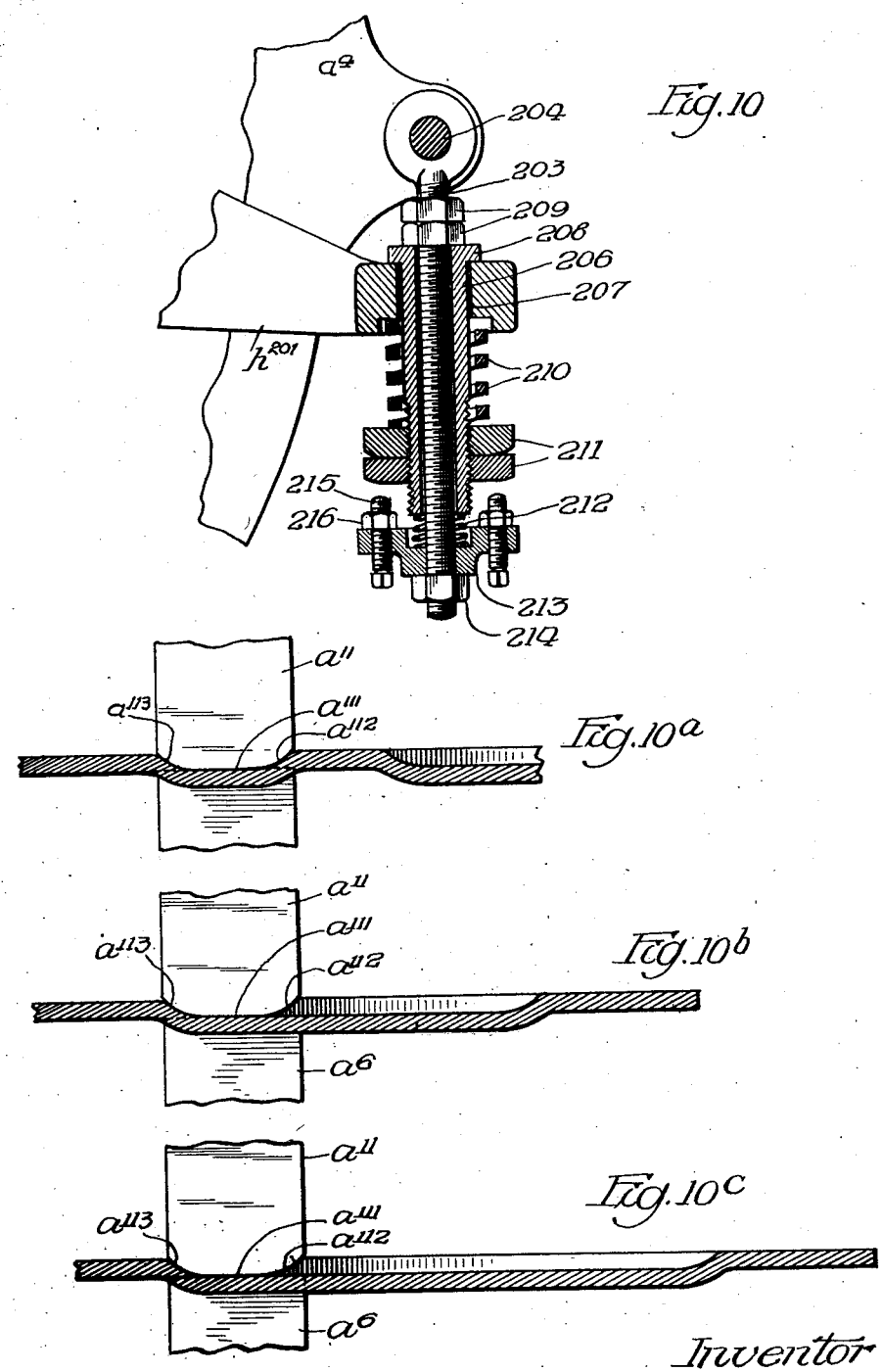

Patented June 17, 1930

1,764,285

UNITED STATES PATENT OFFICE

ALBERT J. BATES, JR., OF CHICAGO, ILLINOIS, ASSIGNOR TO BATES EXPANDED STEEL TRUSS CO., OF EAST CHICAGO, INDIANA, A CORPORATION OF DELAWARE

SHEARING MACHINE

Application filed November 5, 1926. Serial No. 146,332.

The invention relates to shearing machines and more particularly to machines of the reciprocating type for slitting or shearing cold heavy steel used in expanded trussed structures, such as beams or columns.

In shearing slits in beams or bars for expanded metal structures, a desideratum is to provide a unitary machine which is adapted for shearing different sizes of beams. In practice, it is necessary to cut the slits of different lengths, according to the length of the trussed members or strands and the extent of the expansion desired in different finished structures. Objects of the invention are to provide: a unitary shearing machine of the reciprocatory type adapted for this varying work, which may be quickly adjusted for different work; a machine of this type with means to control the operation of the shear-members to automatically render them periodically inoperative to shear and to form intact portions in predetermined portions, such as the ends of the beam; a machine of this type with improved mechanism for adjusting the shearing mechanism for different transverse spacings between them, so that the width of the strand between the slits may be varied, according to the shearing desired in the work; a machine of this type with reciprocatory work-feeding mechanism that may be readily adjusted and varied for different work; improved cutting devices for shearing slits in beams without tearing the metal adjacent the ends of the slits; and a machine for cutting a beam along different lines to form slits with bonds between them, so that the slashes which have a tendency to spread the beam are formed subsequently to the slits along the other lines.

A still further object of the invention is to provide a machine of this type in which the shearing mechanisms may be readily adjusted longitudinally of the work to properly position them for cutting slits along different lines and according to different lengths of strands desired in different work.

Another object of the invention is to provide improved means for delivering the work to and from the shearing mechanisms, which is readily adjustable to facilitate the setting of the machine for work on beams of different cross-sectional shapes or sizes.

Other objects of the invention will appear from the specification.

The invention consists in the several novel features hereinafter set forth and more particularly defined by claims at the conclusion hereof.

In the drawings: Figs. 1, 1$^a$, 1$^b$ are plan views of the central end portions of the machines, the carriages for shearing and resetting mechanisms being shown in section in Fig. 1. Fig. 2 is a front elevation of the portion of the machine shown in Fig. 1. Fig. 2$^a$ is a front elevation of the portion of the machine shown in Fig. 1$^a$, parts being broken away. Fig 2$^b$ is a transverse section on line 2$^b$—2$^b$ of Fig 2$^a$. Fig. 2$^c$ is a transverse section on line 2$^c$—2$^c$ of Fig. 2$^a$. Fig. 3 is a front elevation of the portion of the machine shown in Fig. 1$^b$, parts being broken away. Fig. 3$^a$ is a section on line 3$^a$—3$^a$ of Fig. 3. Fig. 3$^b$ is a section on line 3$^b$—3$^b$ of Fig. 3. Fig. 4 is a transverse section on line 4—4 of Fig. 2. Fig. 5 is a longitudinal section of one of the shearing mechanisms on line 5—5 of Fig. 5$^a$. Fig. 5$^a$ is a section on line 5$^a$—5$^a$ of Fig. 5. Fig. 5$^b$ is a transverse section of one of the shearing mechanisms for cutting the central line of slits in the work. Fig. 6 is a transverse section on line 6—6 of Fig. 2, showing the mechanism for operating the reciprocatory work-feeding mechanism. Fig. 6$^a$ is a section on line 6$^a$—6$^a$ of Fig. 6. Fig. 7 is a transverse section through the mechanism for resetting the deflected metal adjacent the cut after it has been sheared. Fig. 8 is a plan of the intermittently operated carriage for feeding the work step-by-step through the machine. Fig. 8$^a$ is a section on line 8$^a$—8$^a$ of Fig. 8. Fig. 8$^b$ is a section on line 8$^b$—8$^b$ of Fig. 8. Fig. 8$^c$ is a perspective of one of the controller devices for the throw-out devices for the shearing mechanisms. Fig. 9 is a diagrammatic plan of the work to be cut, the reciprocable shearing elements and the charger or feed-bar. Fig. 9$^a$ is a diagrammatic front elevation of the parts shown in Fig. 9. Fig. 9$^b$ is a plan of the beam, showing the method of shearing the web. Fig. 10 is a detail section showing the yielding connection for the arms which carry the work-guides adjacent the cutter and resetting mechanisms. Fig. 10$^a$ is a detail of a pair of coacting cutters showing their operation in shearing the front end of a slit. Fig. 10$^b$ is a similar view, showing the cutters shearing an intermediate portion of the slit and Fig. 10$^c$ is a similar view, showing the cutter-shearing the rear end of a slit.

The invention is exemplified in a machine for shearing the work—a beam F with a web $f'$ and flanges $f^2$—with three series of slits to form a double expanded structure which comprises, a mechanism A for shearing a series of slits $a$ adjacent one flange of the beam; mechanism A$^2$ for shearing a central series of slits $a'$ in the web; mechanism A' for shearing the series of slits $a^2$ adjacent the other flange of the beam; mechanism B for resetting the deflected metal adjacent the slashes; and feed-mechanism for intermittently advancing the work step-by-step through the shearing and resetting mechanisms.

The supporting structure of the machine comprises a bed C (Fig. 2) on which the carriages for the shearing and resetting mechanisms are mounted; a frame for supporting the devices which guide the work to the shearing mechanisms, composed of channel beams D (Figs. 1$^a$ and 2$^a$) and supporting brackets $d$, $d'$, $d^2$ and $d^3$ on which the beams D are fixedly secured; and a frame for supporting the devices which guide the beam after it has been cut composed of channel beams E (Figs. 1$^b$ and 3) and brackets $e$, $e'$, $e^2$ and $e^3$ to which said beams are fixedly secured.

The beam F, exemplifying the work to be sheared, is supported and guided to the shearing mechanism by a series of rollers $g$ adjacent one flange of the beam and a series of rollers $g'$ adjacent the other flange (Figs. 1$^a$, 2 and 2$^b$). The bottom face of the web $f'$ of the beam rides on the peripheries of these rollers. The beam F is confined against transverse movement and guided longitudinally by flanges $g^6$ formed on the rollers $g$, $g'$ respectively and which are provided with faces to engage the outer faces of the flanges of the beam F. Each of said rollers $g$, $g'$ is mounted on a cross-shaft $g^7$ which extends through and is axially slidable in beams D to permit the rollers with their flanges to be adjusted transversely of the frame to adapt them to guide beams of different widths. To facilitate the simultaneous adjustment of all of said rollers, the shafts $g^7$ of the rollers $g$ extend through a bar $g^8$, and the shafts $g^7$ of rollers $g'$ extend through a shifter-bar $g^9$. These bars are confined between said sets of rollers respectively and pins $g^{10}$ on shafts $g^7$, so that transverse movement of the bar $g^8$ will simultaneously adjust the rollers $g$ for one side of the beam F and bar $g^9$ is similarly connected to shafts $g^7$ for rollers $g'$, which are similarly confined on said shafts, so that said rollers may be simultaneously and conjointly adjusted to or from one another by the shift of said bars. Bars $g^8$ and $g^9$ are simultaneously adjustable transversely to equidistantly adjust them to or from each other to position them to guide beams of different widths, by screw-rods $g^{12}$ which have their ends journalled and confined in beams D and are provided with right and left screw-threads which are threaded to said bars; sprocket-wheels $g^{14}$ fixed to the screw-shafts $g^{12}$ respectively; and a chain $g^{15}$ which passes around all of said sprockets so that when the chain is operated both of the bars $g^8$ and $g^9$ will be adjusted towards or from each other to correspondingly shift the guide-rollers $g$, $g'$ for the beam F. Chain $g^{15}$ is guided by idlers $g^{16}$. One of the screw-shafts $g^{12}$ is extended as at $g^{17}$ and provided with a polygonal terminal, so that a crank or wrench may be applied thereto to operate the chain $g^{15}$. This construction exemplifies guide-means for the work which may be quickly adjusted to guide beams of different widths.

The means for guiding (Figs. 1, 1$^a$ 2$^c$) the work (beam F) transversely while it is passing through the shearing and resetting mechanisms comprises a pair of bars $h$ adapted to be engaged by the outer faces of the flanges of the beam F. Said bars have their terminals flared, as at $h'$, (Fig. 1) to direct the beam between them. At either end, each of these bars is supported by a transversely adjustable standard $h^2$ (Fig. 2$^c$). Standards $h^2$ for supporting one end of the guide-bars $h$ are adjustably secured to the supporting-bracket $d^3$ by bolts $h^3$ and slots $h^4$ which permit the brackets to be adjusted to and from each other to vary the spacing between the guide-bars $h$ for beams of different widths. Standards $h^2$ for supporting the other end of bars $h$ are similarly connected to the supporting-bracket $e$. The standards $h^2$ of each pair are adjustable by means of a screw-rod $h^5$ which is provided with right and left-hand threads which are threaded to the lower ends of the standards, so that by turning the rod, both the standards of a pair will be simultaneously and equidistantly adjusted to or from each other. This structure exemplifies adjustable means for supporting work of different widths and properly guiding it transversely while it is being sheared and reset.

The sheared beam is supported vertically by a series of rollers $i$ (Figs. 3, 3$^a$, 3$^b$) which are disposed between the frame-beams E and are shaped so that the edges of the flanges $f^2$ of the beam F will ride thereon. Each of these rollers is journalled on a shaft $i^2$ which is sustained in a pair of arms $i^3$ fixed to a cross-shaft $i^4$ which is journalled in the frame-beams E so the arms will be pivotally supported to raise and lower the rollers $i$ to support beams with flanges of different widths so the sheared portions will be guided and supported in alignment with the beam as it is passing through the shearing mechanism. Shafts $i^4$ and arms $i^3$ for the entire series of rollers $i$ are conjointly adjustable, and for that purpose one of each pair of arms $i^3$ is formed with a downwardly extending lever $i^5$ (Fig. 3) and an adjusting bar $i^6$ is pivoted, as at $i^7$, to the lower ends of each of the levers $i^5$. A screw $i^8$ on one end of bar $i^6$ is provided with adjusting nuts $i^9$ which are adapted to engage a slotted bracket $i^{10}$ to longitudinally adjust the bar $i^6$ and effect the simultaneous adjustment of the rollers $i$ by the adjustment of said nuts. An index $i^{11}$ is fixed to the bracket $e^3$ and a scale $i^{12}$ is provided on the bar $i^6$ to indicate the different positions of the rollers for convenience in adjusting them for beams F of different widths. This exemplifies supporting and guiding means for the sheared beam which is adapted to support beams with different widths after they leave the shearing mechanism.

The shearing mechanism A is supported by a stationary carriage $a^4$, and each of the shearing mechanisms A′, A² is supported in a carriage $a^5$ which is adjustable longitudinally of the work. Each carriage $a^5$ is longitudinally adjustable on the bed C so that the shearing mechanisms A′, A² may be adjusted relatively to the mechanism A and relatively to each other to position them for shearing the initial slashes of slits of different lengths, so they will be spaced apart longitudinally to relatively position the slits according to the length of the strands and the expansion desired in the finished beams. The carriages $a^5$ are each mounted to slide longitudinally on tracks or guides $a^{30}$ formed in a plate $c$ (Fig. 4) which is anchored to the bed C. Bolts $a^{31}$ extend through each of said carriages and their heads are adapted to slide in longitudinal ways $a^{32}$ in plate $c$. When the bolts are tightened, they serve to hold the carriages in assigned positions and when loose permit them to be shifted. Each carriage $a^5$ is adapted to be readily shifted by gearing comprising a cross-shaft $c^2$ journalled in bearings $c^3$ on the carriage, a pinion $c^4$ rotatable by said shaft and meshing with a gear $c^5$ which is fixed to a shaft $c^6$ which is journalled in bearings $c^7$ mounted on the carriage, and pinions $c^8$ fixed to the outer ends of shaft $c^6$ and meshing with longitudinal racks $c^9$ which are fixed to and housed in angle bars $c^{10}$ which are fixed to the plate $c$. Each shaft $c^2$ may be turned by a wrench or crank to shift the carriage longitudinally of the work in either direction. This exemplifies mechanism for shifting two of the shearing mechanisms, so the spacing between them may be varied according to the longitudinal spacing between the beginning of the slits. The shearing mechanisms A, A′ and A² are similar in construction so that a description of one is applicable to all.

Each of said mechanisms (Figs. 5ᵃ, 5ᵇ) comprises a stationary shear-blade $a^6$ and reciprocable shear-blade $a^{11}$. Blade $a^6$ is removably held and clamped between a plate $a^9$ and the vertical wall $a^8$ of a bed $a^{10}$. Movable shear-blade $a^{11}$ is removably secured to a head $a^{12}$ by bolts $a^{13}$ and a clamping plate $a^{14}$. The head $a^{12}$ for the reciprocable shear blade $a^{11}$ is fulcrumed in a shaft $a^{15}$ (Fig. 4) at the back of the carriage.

The coacting shear blades are adjustable transversely so that they may be set for different transverse spacings to vary the width of the strands, when desired for shearing different work. For this purpose, each bed $a^{10}$ for the stationary shear-blades $a^6$ is slidably mounted on its carriage and may be so adjusted by a screw $a^{16}$ which extends through a bracket $a^{17}$ on the carriage and is threaded to a depending lug $a^{18}$ on said bed. Bolts $a^{19}$ extend through slots in the bed $a^{10}$ to lock the bed in its adjusted position. A screw $a^{20}$ is provided to adjust the carriage backwardly to its desired position. To permit the movable cutter head $a^{12}$ to be correspondingly adjusted to keep its cutting edge coactively positioned with respect to blade $a^6$, its fulcrum-shaft $a^{15}$ is mounted in a pair of suspension links $a^{21}$ which are hung from a pivot $a^{22}$ which is stationarily supported in its associated carriage. Links $a^{21}$ are pivoted to swing transversely to the line of travel of the work and to be adjusted by a screw $a^{24}$ which passes through a block $a^{241}$ which is pivoted in the lower end of links $a^{21}$ and has a nut to limit the backward movement of the fulcrum links and a set screw $a^{25}$ which extends through a block $a^{250}$ which is secured to the lugs on the lower ends of links $a^{21}$ and forces the links backwardly against the nut on screw $a^{24}$ to lock the links $a^{21}$ in their assigned position. An anvil $a^{60}$ supports the metal to limit its deflection by the blade $a^{11}$ and permits the said blade to shear and bend the metal between the anvil and the stationary shear-blade. This anvil is mounted on the bed $a^{10}$ and is transversely adjustable with the shear-blade $a^6$. The anvil is connected to the bed by means of slots $a^{61}$ in lugs which straddle the bed and bolts $a^{62}$ which clamp the anvil to the bed. These slots permit the anvil to be adjusted relatively to the stationary shear-blade $a^6$ to control the line of the bend of the metal adjacent the line of the shear. This exemplifies a pair of coacting stationary and reciprocable shear-blades which are adjustable transversely to the line of travel of the work to permit them to be adjusted for different spacings between the slits and for slitting different portions of the webs of beams. An index $a^{28}$ is provided on the shaft $a^{15}$ and a scale $a^{29}$ is secured to the associated carriage, so that the operator may set the movable shear-blade in the position desired by the dimensions of the scale.

In transit through the shearing and resetting mechanisms, the web of the beam being operated upon is supported vertically by the stationary shear-blades and the supports $a^{60}$ and the anvil $b'$ of the resetting mechanism. Transversely, the work is guided by the bars $h$ between which the work passes. The bars $h$ are held against spreading by front and rear abutment-heads $h^{20}$, one pair of which is associated with each cutting mechanism. Each front head $h^{20}$ is threaded to a screw $h^{21}$ which is supported by the associated carriage. The rear head $h^{20}$ is similarly threaded and held rigid by a screw $h^{22}$, the rear end of which is forked to straddle arm $h^{201}$ and hold said screw against rotation.

Each rear head $h^{20}$ is carried by an arm $h^{201}$ which is pivoted at 205 to the cutter-carriage with which it is associated. Each arm $h^{201}$ is subjected to a comparatively light spring-pressure so the rear guide bar $h$ will exert sufficient friction upon the beam F being sheared to prevent overthrow of the beam by the step-by-step feeding mechanism, and is also movable in opposition to greater spring-pressure, when the beam is spread, deformed or irregular in shape. For this purpose, each pressure-device for these arms comprises an I-bolt 203 pivoted at 204 to one of the carriage-frames. A sleeve encircles and is vertically slidable on the shank of said I-bolt, passes through an opening 207 (see Fig. 10) in the rear end of the arm $h^{201}$, and is provided with a shoulder 208 at its upper end against which the arm $h^{201}$ abuts. A pair of nuts 209 are threaded to bolt 203 to adjustably limit the upward limit of movement of the sleeve on the bolt and to fix the normal position of the arm. A heavy spring 210 is coiled around sleeve 206 and is interposed between the arm $h^{201}$ and adjustable nuts 211 which are threaded to the lower end of the sleeve, to normally hold the arm against shoulder 208. The sleeve extends below nuts 211 and is pressed upwardly by a comparatively light spring 212 which is interposed between the lower end of sleeve 206 and a collar 213 which is threaded to the lower end of bolt 203 and locked in its adjusted position by a nut 214 which is also threaded to said bolt. Spring 212 presses the sleeve 206 upwardly with the desired degree of force to apply sufficient pressure to the work to prevent its overthrow by the step-by-step feeding mechanism. The movement of the sleeve on bolt 203, permitted by the spring 212, is limited in range so as to permit the work to be frictionally fed forward without excessive retardance by set-screws 215 which are threaded to collar 213 and locked thereto by lock-nuts 216. The upper ends of screws 215 are engaged by the lower nut 211 to arrest the downward movement of the sleeve permitted by spring 212, so the heavy spring 210 will be rendered effective to resist further movement of the arm $h^{201}$. This occurs when, under abnormal conditions, such as when a flange on the beam F or other work is bent or dented. This construction exemplifies a device for frictionally guiding the work to prevent overthrow with the minimum pressure necessary for that purpose, and in which the additional movement of the guiding means, necessary when the work is deformed, is resisted by heavy spring-pressure.

The mechanism for driving and operating the movable cutter-heads (Figs. 4, 5 and 5ª) comprises an electric motor K suitably mounted on the carriage $a^4$ of the shearing mechanism A; a pinion $k'$ on the shaft of the motor, a gear $k^2$ driven by said pinion and fixed to a shaft $k^3$ which is journalled in brackets $k^4$ and $k^5$ mounted on the carriage $a^4$; a pinion $k^6$ fixed to a shaft $k^3$, a gear $k^7$ driven by pinion $k^6$, and a longitudinally extending shaft $k^8$, to which gear $k^7$ is fixed, which extends through the carriages for, and drives all of, the shear-mechanisms. An eccentric $k^{10}$ is drivably and fixedly connected to the shaft $k^8$ by a key $k^{11}$ and operates the shear-mechanism A, and is confined in the forked upper portion of the carriage $a^4$ and journalled in bearings $k^9$ fixed in said carriage. An eccentric $k^{10}$ is similarly mounted in each of the carriages $a^5$ for the shear mechanisms A' and A², and shaft $k^8$ is connected to drive them by keys which are adapted to slide in a longitudinal key-way $k^{12}$ in said shaft so that the shear-mechanisms A' and A² will be driven by said shaft and so as to permit the carriages $a^5$ for the shear mechanisms A' and A² to be adjusted relatively to each other and to maintain the driving relation between shaft $k^8$ and the eccentrics for said mechanisms in all positions of the carriages. Each eccentric $k^{10}$ operates a link $k^{14}$ which is connected to one of the heads $a^{12}$ of the movable shear-blades to impart a reciprocatory motion to said blade.

In shearing beams for joists or other structural steel, it is sometimes desired to control the operation of the movable shear-blades to leave predetermined portions of the beam unsheared. For example, in the formation of expanded metal joists, it is advantageous to omit the top and bottom slits adjacent the ends of the beam and to form only the central slit (Fig. 9$^b$), so that the terminals of the flanges of the beam will be left with the webs thereon of greater width than the web-portions in the meshes to reinforce the end portions of the joists. For this purpose, adjustable devices are provided to render each of the shear mechanisms A, A' inoperative when desired. Each link $k^{14}$ carries an abutment block $l$ (see Fig. 5) which is fixed to a pin $l'$ which is pivoted in lugs $l^2$ on the head $a^{12}$ and slidable vertically in slots $l^4$. Normally, this abutment block engages a shoe $l^3$ which is fixedly held in a slot in the end of link $k^{14}$. When the abutment block $l$ is swung forwardly to clear the shoe $l^3$, the link $k^{14}$ may be reciprocated by the eccentric $k^{10}$ without imparting an operative stroke to the head $a^{12}$ and the shear-blade carried thereby. An arm $l^5$ is fixed to one end of the pin $l'$ and is automatically controlled by mechanism hereinafter set forth to time the inoperative periods of the shear-mechanism as desired according to the work. Arm $l^5$ is normally and yieldingly held by a spring $l^6$ in position to render the abutment block $l$ operative by the link $k^{14}$.

Mechanism B (Fig. 7) is provided to reset the deflected metal back into its normal plane after it has been sheared and this is mounted in a carriage $b$ which is mounted so it may be adjusted longitudinally on the plate $c$ by mechanism similar to that used for adjusting the carriages $a^5$ of the shear mechanisms A' and A², so that the resetting mechanism may be adjusted to operate at the proper points after the beam has been sheared. This resetting mechanism comprises an anvil $b'$ over which the web of the beam to be sheared passes. This anvil is mounted in a head $b^2$. The anvil is slidably adjusted in the head $b^2$ and adapted to be secured in its adjusted position by bolts $b^8$, so that the anvil may be said to bring its working face to the proper elevation and engage the bottom face of the web of the beam which has been cut. The head $b^2$ is supported by the carriage $b^4$ and is secured thereto by bolts $b^3$ which extend through slots in the head so it may be transversely adjusted on the carriage $b$. A stud $b^4$ under the anvil $b'$ is slidable in the head $b^2$ and rests on an arm $b^5$ which is pivoted at its rear end on a pin $b^6$ which is supported in the carriage $b$. The front end of said arm is supported by a bolt $b^7$ of limited tensile strength, so that if the anvil is for any reason subjected to excessive stresses, the bolt will break and permit the arm $b^4$ to drop and render the resetting mechanism inoperative. The resetting mechanism also comprises a reciprocable hammer $b^9$ which is removably held by bolts $b^{10}$ in a head $b^{11}$ which is fulcrumed at its rear end on a shaft $b^{12}$ which is carried by links $b^{13}$ which are hung on a pin $b^{14}$ supported by the carriage $b$, so that the hammer may be adjusted transversely to the work to operate upon different portions of the web. The position of the link $b^{13}$ is controlled by a screw $b^{15}$ which extends through a block $b^{16}$ which is pivoted in the lower ends of links $b^{13}$ and engaged by the nut on said screw and a set-screw $b^{17}$ which is threaded to a block $b^{18}$ which is secured to the lower ends of said links. The head $b^{11}$ of the hammer $b^{10}$ is reciprocated by the drive-shaft $k^8$ which is extended to slide through the carriage $b$ and is connected to operate said head by means of an eccentric $k^{10}$, a link $k^{14}$ and an abutment block $l$ similar in construction to those used for operating the movable cutter heads. This exemplifies a resetting mechanism which is adjustable longitudinally and transversely to different positions and which is driven from the shaft $k^8$ which drives the shearing mechanisms; also a construction by which the resetting mechanism will be rendered inoperative in event it is subjected to stresses which are likely to result in breakage such as would occur if the stroke of the hammer should be incorrect, or the work should be of excessive thickness.

Mechanism is provided for automatically feeding the work to the shearing mechanism step-by-step, so that the beam will be fed between the active cycles of the reciprocatory shear-blades and also to periodically feed the work, so the shearing mechanisms will skip to form bonds or leave the intact portions desired between the strips of metal which are to form the strands or truss-members of an expanded beam. This mechanism comprises a feed or charger bar M which extends longitudinally of the machine and is reciprocable over the frame beams D and E at the front of the machine. This bar is of a length at least equal to that of the beam to be sheared and is formed with outstruck ratchet teeth $m'$ and is reciprocated in timed relation with the shear-mechanisms. The operating mechanism for this bar M (Figs. 6, 6$^a$) comprises a wrist-pin $m^2$ which is operated by a crank $m^3$ fixed to one end of and continuously rotating with the shaft $k^8$ which drives the shearing and resetting mechanisms; a block $m^4$ on said pin and slidably mounted in a way $m^5$ formed in the front end of a lever $m^6$ which is pivoted on a stud $m^7$ supported by the carriage $a^4$ of the shearing mechanism A; a composite link $m^8$ pivoted at $m^9$ to the rear end of lever $m^6$ and at $m^{10}$ to a rocker $m^{11}$ which is pivoted at $m^{12}$ to said carriage $a^4$; a link $m^{13}$ pivoted at $m^{14}$ to arm $m^{11}$ and at $m^{15}$ to an arm $m^{16}$; a transverse shaft $m^{17}$, mounted in bearings $m^{18}$, and keyed to arm $m^{16}$; an arm $m^{19}$ keyed to the front end of shaft $m^{17}$; a link $m^{20}$ pivoted at $m^{21}$ to arm $m^{19}$; and a lever $m^{22}$ which is fulcrumed at $m^{23}$ on the frame-bracket $e$ (Fig. 2) and has its lower end pivoted at $m^{24}$ to the link $m^{20}$, and its upper end pivoted at $m^{25}$ to a rod $m^{26}$ which is connected to one end of the charger-bar M. The pivot-pin $m^{21}$, between the link $m^{20}$ and the arm $m^{19}$, is adjustable to and from the axis of shaft $m^{17}$ to permit the stroke imparted to the feed or charger bar to be varied for different work. The pivot pin $m^{21}$ extends through a slot $m^{24}$ in arm $m^{19}$ and is provided with a nut by which it may be secured in its assigned position. The lever $m^{22}$ comprises an upper member $m^{250}$ which is connected to the lever by a pin $m^{251}$ which will shear when subjected to excessive stresses, so that if the work should be obstructed, the charger bar will not be damaged.

The teeth $m'$ on the bar M are adapted to intermittently step forward a carriage N (Figs. 8, 8$^a$, 8$^b$) which is provided with a dog $n$ pivoted therein at $n'$ and which is successively engaged by the front faces of said teeth. The carriage N is provided with an extension $n^2$ to engage one of the flanges of the work and with a retaining finger $n^3$. This carriage is mounted to slide on an angle bar $n^4$ which extends longitudinally of the machine and is fixed to the front channel beams D and E, so that the carriage N will be guided throughout the length of the machine and a sufficient distance to feed a beam to be sheared of maximum length through the shearing mechanism. This carriage is provided with rollers $n^7$ and $n^8$ to engage side faces of the angle bar $n^4$ and with shoes $n^{11}$ to ride on the horizontal flange of bar $n^4$. The extension $n^2$ of the carriage is formed on a section $n^9$ which is pivoted to the carriage $n^{10}$ to permit the abutment $n^2$ to be swung upwardly to clear the work when desired. The dog $n$ may be lifted and disengaged from the charger bar when the carriage N is to be retracted to successively feed beams F. The bar M extends through a guide-way $n^{200}$ in the carriage N. During each reciprocation of the feed or charger bar M, one of the teeth $m'$ on the bar will engage the dog $n$ to feed the carriage N and the work forwardly one step. The work is advanced a stroke somewhat less than the width of the shear-blades, so that the cuts will overlap to form continuous slits, as shown in Fig. 9$^b$, it having been found that a succession of strokes of blades, adapted to cut short slits to form a long continuous slit will operate more economically than blades corresponding in length to the length of the slits, and that this method lends itself more readily to a machine which is adapted for shearing different slits or to shear beams of different sizes.

In shearing beams for expanded trussed structures, it is also desirable to periodically feed the work the necessary stroke to form the bonds between the strands or the intact portions of the structures without idling the shear mechanism, and for this purpose the stroke of the feed bar M is in excess of the distance which the work is shifted between the shearing strokes of the blades and sufficient to feed the work the length of one slash and one bond, and there is a series of teeth $m'$ corresponding to the number of cuts necessary to form a complete slit and a space $m^{40}$ between each series, so that the dog $n$ of the work feed-carriage will be fed forwardly five strokes during which the shear mechanisms will make five cuts in succession to form an elongated slit and so that between each series of cuts the spaces $m^{40}$ and the greater throw of bar M will cause a longer stroke to be imparted in the carriage N and the work so that between the successive series of operative strokes the work will be fed forwardly to cause the knives to clear the previously formed slits and leave bonds or intact portions between the ends of the slits.

In setting the shear mechanisms, they are placed so that each mechanism will start a slit at the desired point simultaneously and the commencing and cutting strokes for the slits along different lines will occur simultaneously, and periodically the increased stroke will cause the shear-blades to clear the previously formed slits to simultaneously form bonds, and as a result the work will be fed without idling the shear mechanism.

To automatically and individually control the cutting operation of the shear mechanisms A and A', to selectively render them inoperative and leave unslitted portions adjacent the ends of the beam, as shown at the right of Fig. 9$^b$, the carriage N has secured thereto, as at $i^3$, a horizontal bar $o^2$ which travels with and in advance of the carriage, and devices $o^5$ (Fig. 8$^c$) for operating the arms $l^5$ of the throw-out devices for the movable cutters of mechanisms A and A' are adjustably clamped to said bar $o^2$ and the angle bars $o$ secured thereto. Bar $o^2$ has secured to its underside a pair of angle bars $o$, between which the vertical flange of the stationary angle bar $n^4$ is disposed to guide the bar $o^2$. Each of these controller devices comprises a pair of members $o^4$ and $o^5$ which may be clamped at any point to said bars $o^2$, $o'$ by a bolt $o^6$ and the top member $o^5$ of each controller is adapted to strike the lower end of a lever $o^7$ which is pivoted to a bracket $o^9$ which is fixed to one of the carriages of the shear-mechanisms A, A'. Lever $o^7$ comprises an arm $o^{12}$ which is connected to and pulls a chain $o^{10}$ which is guided on a sheave $o^{11}$ mounted on said bracket and connected to an arm $l^5$. As a result, when a member $o^5$ strikes the lever $o^7$ in the forward movement of the carriage N, the lever will operate the chain $o^{10}$ to rock the shaft $l'$ and swing the abutment $l$ out of the shoe $l^3$, so that the pin $l'$ carried by the operating head $a^{12}$ will not be operated to force the shear-blade $a^{11}$ into or through the beam being sheared. Lever $o^7$ is free to swing to the left independently of the chain $o^{10}$, so that when the carriage is retracted after a beam has been sheared, the throw-out devices will not be operated. The arms $o^7$, of the shearing mechanisms A and A' respectively are attached to the inner and outer sides of the bar $o^2$, so that each of the controlling clamps will operate one of the throw-out levers $o^7$ and clear the other. By adjusting the throw-out devices along the bars $o^2$, $o$, they may be set to control the shear-mechanisms A, A' to leave intact portions in beams of different lengths or at different portions of the beams. This exemplifies mechanism for automatically controlling the shearing mechanism to render the shear-blades inoperative at predetermined points where it is desired to omit the slits, such as at the upper and lower slits of a beam used to form an expanded trussed joist.

Assuming the beam to be sheared, preparatory to expansion, is of a given size, the shear mechanisms A' and A² are set in longitudinal relation to one another according to the lengths of the slits desired for that work. The carriages $a^5$ for the shear mechanisms A' and A² may be readily adjusted by turning the shafts $c^2$. The cutter-heads $a^{12}$ for the reciprocating shear-blades $a^{11}$ and the beds $a^{10}$ for the stationary shear-blades $a^6$ and anvils $a^{60}$ are also adjusted transversely so the slits will be spaced transversely from one another as desired and according to the work and to retain the shear-blades in accurate coacting relation to shear the metal. The transverse adjustment of each head $a^{12}$ of each shear-mechanism is effected by screws $a^{24}$ and $a^{25}$. The adjustment of the bed $a^{10}$ for the stationary shear-blades $a^6$ and the work-supports $a^{60}$ of each mechanism is effected by the rotation of the screws $a^{16}$, $a^{20}$. Rollers $g$, $g'$ with their flanges $g^6$ are then adjusted transversely so that the outer faces of the beam to be cut and the guide-bars $h$ are adjusted transversely according to the width of the beam to be sheared. Adjustment of said rollers is effected by turning the shaft $g^{17}$ which will operate the sprocket-chain $g^{15}$ and the sprocket around which it passes to adjust the bars and $g^9$ which will shift said rollers. Bars $h$, which guide the work transversely through the shearing and resetting mechanisms, are adjusted by turning the screw-shaft $h^5$ to correspondingly adjust the standards $h^2$ which support said bars, and the necessary heads $h^{20}$ are applied to prevent the bars $h$ from being spread adjacent the shearing and resetting mechanisms. The rollers $i$ for supporting the sheared beam are then adjusted by means of the adjusting nuts $i^9$ to bring them to the plane of the lower edges of the flanges of the beam to be sheared. A suitable feed bar M, formed with teeth $m'$ and spaces $m^{40}$ to correspond to the number of cuts for each slit and the spacing between the slits, is connected to the rod $m^{26}$ and extended through its guideway in the feed carriage N. The pivot pin $m^{21}$ between link $m^{20}$ and the slotted arm $m^{19}$ is then adjusted to impart the correct stroke to the feed bar M. If the slits adjacent the flanges of the beam are to be omitted from the ends thereof, controlling clamps $o^4$, $o^5$ are set on the bar $o^2$ at such points that the shear-mechanisms A and A' will be rendered ineffective to shear the metal the correct distance while the ends of the bars are passing through said shear-mechanisms. These devices may be set according to the length of the beam, so that as beams of the same length are fed through the machine, each will be left uncut at its ends the extent desired.

The machine will then be in readiness for operation according to its setting; the carriage N will be in its retracted position adjacent the left-hand end of the machine, and the beams to be sheared will be successively laid on the rollers $g$, $g'$ and between their flanges $g^6$ and between bars $h'$. The motor K will then be started and the beam will be alternately advanced and sheared and the operation will be continued until the entire beam has been sheared. The carriage N will then be retracted and the machine will be in readiness for shearing the next beam.

The friction between the bars $o$, $o'$, $o^2$ and the vertical flange of the track $n^4$ is sufficient to prevent retraction of the carriage. To aid the operator in retracting the carriage N after the cutting of a beam has been completed, a cable S is provided at its end with a hook (not shown) which is adapted to engage the plate $o^2$ of the carriage. This cable is guided by a pulley $s^2$ which is carried by a support fixed to the carriage of the shearing mechanism A and extends around an overhead sheave (not shown) and has attached thereto a weight.

In slashing a series of slits in beams or bars for expanded metal structures, it is desirable to avoid breaking the web adjacent the ends of the slits, and for that purpose, each cutter $a^{11}$ has a substantially straight central portion $a^{111}$ and a rounded or inclined end $a^{112}$ to form the front end of each slash and a reversely rounded or inclined end $a^{113}$ for the rear end of each slash. The coacting edge of each cutter-blade $a^6$ is substantially straight. In action, the feed strokes of the work while cutting the slits are shorter than the width of the blades so each blade $a^{11}$ will produce the several connected slashes necessary to form a slit of the desired length. The first stroke of each series forms the rear end of the slit. As a result, of this formation of the blades, a clean straight cut is formed and the portion $a^{112}$ deflects the metal adjacent the foremost end of each slit without breaking the adjacent portion of the web and produces a similar result at the rear end of the slit, as illustrated in Figs. $10^a$, $10^b$ and $10^c$.

The eccentrics $k^{10}$ for the cutting mechanisms respectively and the resetting hammer $b^9$ are relatively positioned on the shaft $k^8$ and timed so that the cutter blades $a^{11}$ will, during each downward stroke, successively slash the metal between the successive feed-strokes of the work.

The shearing mechanisms A and A', for cutting the border slits $a$ and $a^2$, are positioned to operate successively upon the beams in advance of the cutter for shearing the central slit $a'$, so that in its passage through the machine, the border slits are cut before the central slit is cut. This has been found to be an important feature in the operation of the machine in the production of expanded structures, such as joists and the like, because, in shearing the central slit of the end series which intersects the end of the beam, internal stresses are produced in the steel which cause the flanges at the ends to flare outwardly or to become distorted, and in such condition it would be difficult to controllably guide the beam while shearing the border slits. By the arrangement shown, the cutter mechanisms A and A' cut the border lines of slits in the web of the work in advance of the cutting of the central line of slits, so that no shearing need be done after the deformation has occurred. This deformation does not present any difficulties in passing through the resetting mechanism, because the broad anvils will be effective notwithstanding the deformation.

The invention exemplifies a machine for shearing beams which is adapted to be adjusted for beams of different heights; for shearing slits of different lengths and differently spaced apart; and in which the beam is automatically and periodically fed an increased distance to leave the desired bonds in the web being sheared by mechanism which may be readily varied to feed different work. The invention also exemplifies a machine in which provision is made for automatically and selectively throwing out of action the shear machanisms where it is desired to leave the metal unsheared; also one in which provision is made for operating the resetting mechanism in conjunction with the shearing mechanisms, so that the beam when it leaves the machine is ready for the expanding operation. The invention also exemplifies a machine in which the work is frictionally retarded to prevent overthrow and guided by spring-pressed means to permit distorted portions of the beam to be properly fed past the cutting mechanisms; in which the cutter blades are formed to deflect the end portions of the slits without breaking the web adjacent the ends of the slits; and in which the cutting mechanisms are arranged to operate upon a given portion of the beam in such succession that the slits which cause the greatest distortion are last cut in that portion of the beam.

In the operation of rotary shearing machines, it has been found that the time required in changing the cutters and the cost of providing cutters of different sizes renders them uneconomical where beams are to be differently sheared or for shearing beams of different sizes, while the machine herein set forth may be readily and quickly reset so that it is economical in operation and for shearing beams of different sizes.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a machine of the character described, the combination of shearing mechanisms for cutting beams or bars on different lines, each comprising a reciprocable shearing element, mechanism for intermittently feeding the work longitudinally to said shearing mechanisms so the latter will cut series of connected slashes to form slits, individual mechanisms for reciprocating said elements, and means to relatively vary the spacing of the elements longitudinally of the work so they will operate at points differently spaced apart longitudinally.

2. In a machine of the character described, the combination of shearing mechanisms for cutting beams or bars on different lines, each comprising a reciprocable shearing element and a carriage, mechanism for intermittently feeding the work longitudinally to said shearing mechanisms so the latter will cut series of connected slashes to form slits, mechanisms for reciprocating said elements, and means to relatively vary the spacing of the carriages longitudinally of the work so the shearing elements will operate at points differently spaced apart longitudinally of the work.

3. In a machine of the character described, the combination of shearing mechanisms for cutting metal bars or beams on different lines, each comprising a reciprocable shearing element, mechanism for intermittently feeding the work longitudinally to said shearing mechanisms so the latter will cut series of connected slashes to form slits, means to relatively vary the longitudinal spacing between the elements, and means to relatively vary the tranverse spacings between the elements to vary the transverse spacing between the slits cut in the work.

4. In a machine of the character described, the combination of shearing mechanisms for cutting metal bars or beams on different lines, each comprising a reciprocable shearing element and a carriage, mechanism for intermittently feeding the work longitudinally to said shearing mechanisms so the latter will cut series of connected slashes to form slits, means to relatively vary the longitudinal spacing between the elements, and means to relatively vary the transverse spacings between the elements to vary the transverse spacing between the elements to vary the transverse spacing between the slits cut in the work.

5. In a machine of the character described, the combination of shearing mechanisms for simultaneously cutting metal beams or bars on different lines, each comprising a reciprocable shearing element, variable means for feeding the work step-by-step to said mechanisms so the latter will cut series of connected slashes to form slits, and means to relatively vary the longitudinal spacings of the elements.

6. In a machine of the character described, the combination of shearing mechanisms for simultaneously cutting metal beams or bars on different lines, each comprising a reciprocable shearing element and a carriage, variable means for feeding the work step-by-step to said mechanisms so the latter will cut series of connected slashes to form slits, and means to relatively vary the longitudinal spacing between the carriages to vary the longitudinal spacings between the elements.

7. In a machine of the character described, the combination of shearing mechanisms for simultaneously cutting metal beams or bars on different lines, each comprising a reciprocable shearing element, means for feeding the work step-by-step to said mechanisms comprising a replaceable bar, and means to relatively vary the longitudinal spacings of the elements.

8. In a machine of the character described, the combination of shearing mechanisms for cutting metal bars or beams on different lines, each comprising a reciprocable shearing element, mechanism for intermittently feeding the work longitudinally to said shearing mechanisms, so that elements will alternately cut a series of connected slashes to form slits and leave bonds between the ends of the slits, mechanism for reciprocating said elements, and means to relatively vary the longitudinal spacing between the shearing elements so they will operate at points differently spaced apart longitudinally of the work.

9. In a machine of the character described, the combination of shearing mechanisms for cutting metal bars or beams on different lines, each comprising a reciprocable shearing element, mechanism for intermitently feeding the work longitudinally to said shearing mechanisms, so the elements will alternatly cut a series of connected slashes to form slits and leave bonds between the ends of the slits, mechanism for reciprocating said elements, means to relatively vary the longitudinal spacing between the shearing elements so they will operate at points differently spaced apart longitudinally of the work, and means to relatively adjust the elements transversely to vary the transverse spacing between the slits cut in the work.

10. In a machine of the character described, the combination of shearing mechanisms for cutting metal bars or beams on different lines, each comprising a reciprocable shearing element, mechanism for intermittently feeding the work longitudinally to said shearing mechanisms, so the elements will alternately cut a series of connected slashes to form slits and leave bonds between the ends of the slits comprising a variable controller, mechanism for reciprocating said elements, and means to relatively vary the longitudinal spacing between the shearing elements so they will operate at points differently spaced apart longitudinally of the work.

11. In a machine of the character described, the combination of shearing mechanisms for cutting metal bars or beams on different lines, each comprising a reciprocable shearing element, mechanism for intermittently feeding the work longitudinally to said shearing mechanisms, so the elements will alternately cut a series of connected slashes to from slits and leave bonds between the ends of the slits comprising a variable controller, mechanism for reciprocating said elements, and means to relatively vary the longitudinal spacing between the shearing elements so they will operate at points differently spaced apart longitudinally of the work, and means to relatively adjust the elements transversely to vary the transverse spacing between the slits cut in the work.

12. In a machine of the character described, the combination of a series of shearing mechanisms for cutting metal bars or beams on different lines, each comprising a reciprocable shearing element and a carriage, one of the carriages being stationary and the others movable relatively to one another and to the stationary carriage to vary the longitudinal spacing between the shearing elements so the elements will operate at points differently spaced apart, longitudinally of the work, mechanisms for intermittently feeding the work longitudinally to said shearing mechanisms, and mechanism for operating the shearing elements.

13. In a machine of the character described, the combination of a series of shearing mechanisms for cutting metal bars or beams on different lines, each comprising a reciprocable shearing element and a carriage, one of the carriages being stationary and the others movable relatively to one another and to the stationary carriage to vary the longitudinal spacing between the shearing elements so the elements will operate at points differently spaced apart, longitudinally of the work, means to vary the transverse spacing of the elements to vary the spacing between the slits, mechanism for intermittently feeding the work longitudinally to said shearing mechanisms, and mechanism for operating the shearing elements.

14. In a machine of the character described, the combination of shearing mechanisms for cutting metal beams or bars on different lines, each comprising a reciprocable shearing element, mechanism for intermittently feeding the work longitudinally to said shearing mechanisms, means to relatively vary the spacing of the elements longitudinally of the work so they will operate at points differently spaced apart longitudinally of the work, resetting mechanism movable longitudinally of the work, and mechanism for conjointly operating said elements and the resetting mechanism.

15. In a machine of the character described, the combination of shearing mechanisms for cutting metal beams or bars on different lines, each comprising a reciprocable shearing element, mechanism for intermittently feeding the work longitudinally to said shearing mechanisms, means to relatively vary the spacing of the elements longitudinally of the work so they will operate at points differently spaced apart longitudinally of the work, means to vary the transverse spacing between the elements, a resetting mechanism movable longitudinally of the work, and mechanism for conjointly operating said elements and the resetting mechanism.

16. In a machine of the character described, the combination of shearing mechanisms for cutting metal beams or bars on different lines, each comprising a reciprocable shearing element, mechanism for intermittently feeding the work longitudinally to said shearing mechanisms, means to relatively vary the spacing of the elements longitudinally of the work so they will operate at points differently spaced apart longitudinally, and means for guiding and supporting work of different shapes to the shearing mechanisms.

17. In a machine of the character described, the combination of shearing mechanisms for cutting metal beams or bars on different lines, each comprising a reciprocable shearing element, mechanism for intermittently and variably feeding the work longitudinally to said shearing mechanisms, means to relatively vary the spacing of the elements longitudinally of the work so they will operate at points differently spaced apart longitudinally, and adjustable means for guiding and supporting work of different shapes to the shearing mechanisms.

18. In a machine of the character described, the combination of shearing mechanisms for cutting metal beams or bars on different lines, each comprising a reciprocable shearing element, variable mechanism for intermittently feeding the work longitudinally to said shearing mechanisms, means to relatively vary the spacing of the elements longitudinally of the work so they will operate at points differently spaced apart longitudinally, means to vary the transverse spacing between the elements, and adjustable means for guiding and supporting work of different shapes to the shearing mechanisms.

19. In a machine of the character described, the combination of reciprocatory shearing mechanisms for cutting metal beams or bars on different lines, each comprising a pair of coacting shearing elements, the mechanisms being spaced apart and adjustable longitudinally for shearing slits of different lengths and adjustable transversely to vary the transverse spacing between them, variable means for feeding the work step-by-step so the elements will simultaneously cut connected slashes to form elongated slits and to leave bonds between them, and mechanism for operating the shearing mechanisms.

20. In a machine of the character described, the combination of reciprocatory shearing mechanisms for cutting metal beams or bars on different lines, each comprising a pair of coacting shearing elements, the mechanisms being spaced apart and adjustable longitudinally to shear slits of different lengths and adjustable transversely to vary the transverse spacing between them, variable means for feeding work of different shapes or sizes step-by-step so the elements will simultaneously shear connected slashes to form elongated slits and to leave bonds between them, and mechanism for operating the shearing mechanisms.

21. In a machine of the character described, the combination of reciprocatory shearing mechanisms for cutting metal beams or bars on different lines, each comprising a pair of coacting shearing elements, the mechanisms being spaced apart and adjustable longitudinally for shearing slits of different lengths and adjustable transversely to vary the transverse spacing between them, variable means for feeding different shapes or sizes of work step-by-step so the elements will simultaneously shear connected slashes to form elongated slits and to leave bonds between them, resetting reciprocatory mechanism for the deflected metal adjacent the slits, and mechanism for operating the shearing and resetting mechanisms.

22. In a machine of the character described, the combination of reciprocatory shearing mechanisms for cutting metal beams or bars on different lines, each comprising coacting shearing elements, mechanism for operating said shearing mechanisms, mechanism for intermittently feeding the work longitudinally to the shearing mechanisms so they will shear a series of connected cuts to form slits and to leave bonds between them, and means, controlled by the feed mechanism, to selectively render one of the shearing mechanisms inoperative to omit the slits where desired.

23. In a machine of the character described, the combination of reciprocatory shearing mechanisms for cutting metal beams or bars on different lines, each comprising coacting shearing elements, mechanism for operating said shearing mechanisms, mechanism for intermittently feeding the work longitudinally to the shearing mechanisms, so they will slash a series of connected cuts to form slits and to leave bonds between them, and means to selectively render one of the shearing mechanisms inoperative to leave uncut portions where desired at the ends of the work comprising a controlling device, said feed-mechanism comprising a carriage on which the controlling device is mounted.

24. In a machine of the character described, the combination of a series of reciprocatory shearing mechanisms for cutting metal beams or bars on different lines, each comprising coacting shearing elements, mechanism for intermittently feeding the work longitudinally to the shearing mechanisms, so they will slash a series of connected cuts to form slits and to leave bonds between them, mechanism for operating said shearing and feed mechanisms, and means to selectively render two of the shearing mechanisms inoperative to leave uncut portions where desired at the ends of the work comprising a controlling device, said feed mechanism comprising a carriage, on which the controlling devices are mounted.

25. In a machine of the character described, the combination of reciprocatory shearing mechanisms for cutting metal beams or bars on different lines, each comprising coacting shearing elements, mechanism for operating said mechanisms, mechanism for intermittently feeding the work longitudinally to the shearing mechanisms so they will cut a series of connected cuts to form slits and to leave bonds between them, and automatic means to selectively render one of the shearing mechanisms inoperative to omit the slits where desired.

26. In a machine of the character described, the combination of reciprocatory shearing mechanisms for cutting metal beams or bars on different lines, each comprising coacting shearing elements, mechanism for operating the shearing mechanisms, mechanism for intermittently feeding the work longitudinally to the shearing mechanisms so they will shear a series of connected cuts to form slits and to leave bonds between them, and adjustable means to selectively render one of the shearing mechanisms inoperative to omit the slits where desired.

27. In a machine of the character described, the combination of a series of reciprocatory shearing mechanisms for cutting metal beams or bars on different lines, each comprising coacting shearing elements, mechanism for operating said shearing mechanisms, mechanism for intermittently feeding the work longitudinally to the shearing mechanisms, so they will shear a series of connected cuts to form slits and to leave bonds between them, and means to selectively render two of the shearing mechanisms inoperative to leave uncut portions where desired at the ends of the work comprising controlling devices for a plurality of said shearing mechanisms, said feed mechanism comprising a carriage on which the controlling devices are mounted.

28. In a machine of the character described, the combination of a series of reciprocatory shearing mechanisms for cutting metal beams or bars on different lines, each comprising coacting shearing elements, mechanism for operating said shearing mechanisms, mechanism for intermittently feeding the work longitudinally to the shearing mechanisms, so they will shear a series of connected cuts to form slits and to leave bonds between them, and means to selectively render two of the shearing mechanisms inoperative to leave uncut portions where desired at the ends of the work comprising controlling devices for a plurality of said shearing mechanisms, said feed mechanism comprising a carriage on which the controlling devices are adjustably mounted.

29. In a machine of the character described, the combination of reciprocatory shearing mechanisms for cutting metal beams or bars on different lines, each comprising a pair of coacting elements, mechanism for conjointly operating the shearing mechanisms, comprising a shaft and an operating connection between the shaft and one of the elements, one of said connections including a throw-out device to render one of the elements inoperative, means for feeding the work longitudinally to said mechanisms, and means for operating the throw-out device.

30. In a machine of the character described, the combination of a series of reciprocatory shearing mechanisms for cutting metal beams or bars on different lines, each comprising a pair of coacting elements, mechanism for conjointly operating the shearing mechanisms, comprising a shaft and an operating connection between the shaft and one of the elements, one of said connections including a throw-out device to render one of the elements operated thereby operative, means for feeding the work longitudinally to said mechanisms, and adjustable means for operating the throw-out device.

31. In a machine of the character described, the combination of reciprocatory shearing mechanisms for cutting metal beams or bars on different lines, each comprising a pair of coacting elements, one of said pairs of elements being longitudinally and transversely adjustable, mechanism for conjointly operating the shearing mechanisms, comprising a shaft and an operating connection between the shaft and one of the elements, one of said connections including a throw-out device to render the elements operated thereby operative, means for feeding the work longitudinally to said mechanisms comprising a carriage, and means for controlling the throw-out device, mounted on the carriage.

32. In a machine of the character described, the combination of shearing mechanisms for cutting metal bars or beams on different lines, each comprising a carriage and coacting shearing elements mounted on the carriage, one of the carriages being movable longitudinally of the work to vary the longitudinal spacing between the shearing elements so they will cut at points differently spaced apart, mechanism for intermittently feeding the work longitudinally to the shearing mechanisms to cut slits and leave bonds between them, and mechanism for operating the shearing mechanisms comprising a shaft along which the movable carriage is slidable, and separate operating connections between the shaft and the shearing elements on the carriages.

33. In a machine of the character described, the combination of shearing mechanisms for cutting metal bars or beams on different lines, each comprising a carriage and coacting shearing elements mounted on the carriage, one of the carriage being movable longitudinally of the work to vary the longitudinal spacing between the shearing elements so they will cut at points differently spaced apart, mechanism for intermittently feeding the work longitudinally to the shearing mechanisms to cut slits and leave bonds between them, mechanism for operating the shearing mechanisms comprising a shaft along which the movable carriage is slidable, and separate operating connections between the shaft and the shearing elements on the carriages, one or more of the connections including a throw-out device, and means operated by the feed-mechanism for controlling said device or devices.

34. In a machine of the character described, the combination of a series of shearing mechanisms for cutting metal bars or beams on different lines, each comprising a carriage and coacting shearing elements mounted on the carriage, a plurality of the carriages being movable longitudinally of the work to vary the longitudinal spacing between the shearing elements so they will cut at points differently spaced apart, mechanism for intermittently feeding the work longitudinally to the shearing mechanism to cut slits and leave bonds between them, mechanism for operating the shearing mechanisms comprising a shaft along which the movable carriages are slidable, and separate operating connections between the shaft and one of the shearing elements on each carriage, and gearing for shifting the movable carriages.

35. In a machine of the character described, the combination of reciprocatory shearing mechanisms for cutting metal beams or bars on different lines, each comprising a pair of coacting shearing elements, mechanism for operating the shearing mechanisms, and mechanism for intermittently feeding the work longitudinally so the elements will cut connected slashes to form a series of elongated slits and to leave bonds between them, comprising a longitudinally movable carriage, and a toothed bar for advancing the carriage, said bar being removable so it may be replaced by another.

36. In a machine of the character described, the combination of reciprocatory shearing mechanisms for cutting metal beams or bars on different lines, each comprising a pair of coacting shearing elements, mechanism for operating the shearing mechanisms, and mechanism for intermittently feeding the work longitudinally so the elements will cut connected slashes to form elongated slits and to leave bonds between them comprising a longitudinally movable carriage, a dog on the carriage, and a reciprocating toothed bar for advancing the dog, removable so it may be replaced by another.

37. In a machine of the character described, the combination of reciprocatory shearing mechanisms for cutting metal beams or bars on different lines, each comprising a pair of coacting shearing elements, mechanism for operating the shearing mechanisms, and automatic mechanism for intermittently feeding the work longitudinally so the elements, during operation thereof, will cut connected slashes to form elongated slits and to leave bonds between them comprising a longitudinally movable carriage, and means to vary the advancing strokes of the carriage.

38. In a machine of the character described, the combination of reciprocatory shearing mechanisms for cutting metal beams or bars on different lines, each comprising a pair of coacting shearing elements, mechanism for operating the shearing mechanisms, and automatic mechanism for intermittently feeding the work longitudinally so the elements, during operation thereof, will cut connected slashes to form elongated slits and leave bonds between them comprising a longitudinally movable carriage, a reciprocable toothed bar removable so it may be released, and means to vary the advancing strokes of the bar.

39. In a machine of the character described, the combination of reciprocatory shearing mechanisms for slitting beams longitudinally on different lines, intermittent work-feeding mechanism, and mechanism for operating the shearing and feed mechanisms to slash a line of slits with bonds between them and at the ends of the beams, and another line of slits which intersect the beam ends, the cutting mechanisms being relatively arranged to cut the line of slits with bonds at the beam-ends at a point longitudinally in advance of the mechanism which cuts the line of end intersecting slits so the deformation of bar resulting from end slitting will occur subsequently to the cutting of the other line of slits.

40. In a machine of the character described, the combination of reciprocatory shearing mechanisms for slitting beams longitudinally on different lines, intermittent work-feeding mechanism, and mechanism for operating the shearing and feed mechanisms to slash a line of slits with bonds between them and at the ends of the beams, and another line of slits which intersect the beam ends, the cutting mechanisms being longitudinally adjustable and relatively arranged to cut the line of slits with bonds at the beam ends in the beam at a point longitudinally in advance of the mechanism which cuts the line of end intersecting slits so the deformation of bar, resulting from end slitting, will occur subsequently to the cutting of the other line of slits.

41. In a machine of the character described, the combination of reciprocatory shearing mechanism for slitting beams longitudinally on different lines, intermittent work-feeding mechanism, mechanism for operating the shearing and feed mechanisms to slash a line of slits with bonds between them and at the ends of the beams, and another line of slits which intersect the beam ends, the cutting mechanisms being relatively arranged to cut the line of slits with bonds at the beam ends at a point longitudinally in advance of the mechanism which cuts the line of end intersecting slits so the deformation of bar resulting from end slitting will occur subsequently to the cutting of the other line of slits, and mechanism for resetting the metal adjacent the slits.

42. In a machine of the character described, the combination of reciprocatory shearing mechanisms for slitting beams longitudinally on different lines, intermittent work-feeding mechanism, mechanism for operating the shearing and feed mechanisms to slash a line of slits with bonds between them and at the ends of the beams, and another line of slits which intersect the beam ends, the cutting mechanisms being adjustable longitudinally of the work and relatively arranged to cut the line of slits with bonds at the beam ends at a point longitudinally in advance of the mechanism which cuts the line of end intersecting slits so the deformation of bar, resulting from end slitting, will occur subsequently to the cutting of the other line of slits, and mechanism for resetting the metal adjacent the slits.

43. In a machine of the character described, the combination of reciprocatory shearing mechanisms for slitting beams longitudinally on different lines, intermittent work-feeding mechanism, and mechanism for operating the shearing and feed mechanisms to slash a line of slits with bonds between them and at the ends of the beams, and another line of slits which intersect the beam ends, the cutting mechanisms being relatively arranged in longitudinal succession to cut the line of slits with bonds at the beam ends at a point longitudinally in advance of the mechanism which cuts the line of end intersecting slits so the deformation of bar, resulting from end slitting, will occur subsequently to the cutting of the other line of slits.

44. In a machine of the character described, the combination of reciprocatory shearing mechanisms for slitting beams longitudinally on three different lines, intermittent work-feeding mechanism, and mechanism for operating the feed-mechanism and the shearing mechanisms to cut lines of slits with bonds between them, the cutting mechanisms being relatively arranged to cut the different lines of slits in longitudinal succession in the same portion of the work.

45. In a machine of the character described, the combination of reciprocatory shearing mechanisms for slitting beams longitudinally on different marginal and central lines, intermittent work-feeding mechanism, and mechanism for operating the feed-mechanism and the shearing mechanisms to cut marginal lines of slits with bonds between them and at the beam ends and the medial line with slits intersecting the beam-ends, the cutting mechanisms being relatively arranged to cut the marginal lines of slits longitudinally in advance of the cutting of the medial line of slits in the same portion of the work.

46. In a machine of the character described, the combination of reciprocatory shearing mechanisms for slitting beams longitudinally on different marginal and central lines, intermittent work-feeding mechanism, and mechanism for operating the feed mechanism and the shearing mechanisms to cut marginal lines of slits with bonds between them and at the beam ends and the medial line with slits intersecting the beam-ends, the cutting mechanisms being adjustable longitudinally of the work and relatively arranged to cut the marginal lines of slits longitudinally in advance of the cutting of the medial line of slits in the same portion of the work.

47. In a machine of the character described, the combination of reciprocatory shearing mechanisms for slitting beams longitudinally on different marginal and medial lines, intermittent-work feeding mechanism, and mechanism for operating the feed mechanism and the shearing mechanisms to cut the marginal lines of slits with bonds between them and at the beam ends and the medial line with slits intersecting the beam-ends, the cutting mechanisms being relatively arranged to cut the marginal lines of slits in the work in advance of the cutting of the medial line of slits in the same portion of the work.

48. That improvement in the shearing of beams for expanded metal structures with slits on a longitudinal line with bonds between them and at the ends of the beams and on one line with slots, intersecting the ends of the beam which consists in cutting the end-intersecting line of slits subsequently to the cutting of the other slits.

49. That improvement in the shearing of beams for expanded metal structures with slits on two different longitudinal lines with bonds between them and at the ends of the beam, and on one line with slits intersecting the ends of the beam which consists in cutting the end-intersecting line of slits subsequently to the cutting of the other slits.

50. That improvement in shearing beams for expanded metal structures with a medial series of slits, some of which intersect the ends of the beam and a series of marginal slits with uncut portions at the ends of the beams which consists in first cutting the marginal slits in a portion of the beam and thereafter cutting the central slits in the same portion of the beam.

51. That improvement in shearing beams for expanded metal structures with a medial series of slits, some of which intersect the ends of the beam and a series of marginal slits with uncut portions at the ends of the beams which consists in first cutting the marginal slits in a portion of the beam and thereafter cutting the central slits in the same portion of the beam and resetting the metal adjacent the slits.

52. In a machine for shearing beams to form a series of slits with bonds between them, the combination of a pair of coacting cutter blades, mechanism for reciprocating one of the blades, and mechanism for intermittently feeding the work longitudinally of the slits, one of the blades being provided with an inclined end portion to deflect the metal adjacent the front and rear ends of a slit without breaking the web adjacent the ends of the slit.

53. In a machine for shearing beams to form a series of slits with bonds between them, the combination of a pair of coacting cutter blades, mechanism for reciprocating one of the blades, and mechanism for intermittently feeding the work longitudinally of the slits in timed relation with respect to the reciprocating mechanism and in such a manner that the blades, during operation thereof, cut series of connected slashes and form elongated slits with bonds between the ends of the slits, one of the blades being provided with a straight medial portion and an inclined end portion to deflect the metal adjacent the front and rear ends of a slit without breaking the web adjacent the ends of the slit.

54. In a machine of the character described, the combination of reciprocatory cutting mechanism for shearing a beam or bar, mechanism for intermittently feeding the work through the shearing mechanism, guide means for the work, and means for applying differential pressures to frictionally hold the work, and for permitting the passage of deformations in the work.

55. In a machine of the character described, the combination of reciprocatory cutting mechanism for shearing a beam or bar, mechanism for intermittently feeding the work through the shearing mechanism, means for guiding the work, means for applying pressure to the guiding-means to frictionally hold the work, and means of differentially greater resistance for permitting the guide-means to yield responsively to deformations in the work.

56. In a machine of the character described, the combination of reciprocatory cutting mechanism for shearing a beam or bar, mechanism for intermittently feeding the work through the shearing mechanism, means for guiding the work, means having limited movement for applying pressure to frictionally hold the work, and means of differentially greater resistance for permitting the passage of deformations in the work.

57. In a machine of the character described, the combination of reciprocatory cutting mechanism for shearing a beam or bar, mechanism for intermittently feeding the work through the shearing mechanism, means for guiding the work, means having limited movements for applying pressure to frictionally hold the work, and adjustable means of differentially greater resistance for permitting the passage of deformations in the work.

58. In a machine of the character described, the combination of reciprocatory cutting mechanism for shearing a beam or bar, mechanism for intermittently feeding the work through the shearing mechanism, means for guiding the work, adjustable means having limited movement for applying pressure to frictionally hold the work, and adjustable means of differentially greater resistance for permitting the passage of deformations in the work.

59. In a machine of the character described, the combination of reciprocatory cutting mechanism for shearing a beam or bar, mechanism for intermittently feeding the work through the shearing mechanism, means for guiding the work, means comprising a spring for applying pressure to the guiding means to frictionally hold the work, and successively acting means comprising a spring of differentially greater resistance for permitting the guide-means to yield responsively to deformations in the work.

60. In a machine of the character described, the combination of reciprocatory cutting mechanism for shearing a beam or bar, mechanism for intermittently feeding the work through the shearing mechanism, means for guiding the work, an arm for the guide-means, a spring for applying pressure to the arm to frictionally hold the work, means to limit the movement of the arm relatively to said spring, and a spring of greater resistance for permitting the arm to yield responsively to deformations in the work.

61. In a machine of the character described, the combination of reciprocatory cutting mechanism for shearing a beam or bar, mechanism for intermittently feeding the work through the shearing mechanism, means for guiding the work, an arm applied to the guide-means, a bolt, a sleeve slidable on the bolt and applied to the arm, a spring carried by the sleeve and applied to resist the movement of the arm relatively to the sleeve, a spring on the bolt applied to the sleeve, and means carried by the bolt to positively limit the movement of the sleeve.

Signed at East Chicago, Indiana, this 20th day of September, 1926.

ALBERT J. BATES, JR.